(12) United States Patent
Suzuki et al.

(10) Patent No.: US 6,587,509 B1
(45) Date of Patent: Jul. 1, 2003

(54) REDUCING UNDESIRABLE EFFECTS OF AN EMPHASIS PROCESSING OPERATION PERFORMED ON A MOVING IMAGE BY ADDING A NOISE SIGNAL TO A DECODED UNCOMPRESSED SIGNAL

(75) Inventors: Teruhiko Suzuki, Chiba (JP); Yoichi Yagasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 08/968,396

(22) Filed: Nov. 12, 1997

Related U.S. Application Data

(63) Continuation of application No. 08/570,696, filed on Dec. 11, 1995, now abandoned.

(30) Foreign Application Priority Data

Dec. 12, 1994 (JP) ............................................. 6-332674

(51) Int. Cl.[7] ................................................ H04N 7/18
(52) U.S. Cl. ........................... 375/240.29; 375/240.26; 375/240.23
(58) Field of Search ................................ 348/384, 385, 348/405, 404, 398, 416, 411, 412, 699, 845.1, 845.2, 845.3; 375/240.01–240.29

(56) References Cited

U.S. PATENT DOCUMENTS

| | | | | |
|---|---|---|---|---|
| 5,285,157 A | * | 2/1994 | Zur | 324/309 |
| 5,291,284 A | * | 3/1994 | Carr et al. | 348/415 |
| 5,367,629 A | * | 11/1994 | Chu et al. | 395/162 |
| 5,369,502 A | * | 11/1994 | Fukuda et al. | 358/431 |
| 5,377,266 A | * | 12/1994 | Katta et al. | 380/20 |
| 5,512,956 A | * | 4/1996 | Yan | 348/606 |
| 5,552,832 A | * | 9/1996 | Astle | 348/420 |
| 5,565,921 A | * | 10/1996 | Sasaki et al. | 348/409 |

* cited by examiner

Primary Examiner—Andy Rao
(74) Attorney, Agent, or Firm—Frommer Lawrence & Haug LLP; William S. Frommer

(57) ABSTRACT

A moving image decoding method and a moving image decoding apparatus for reproducing a natural image from a digital image signal, even when it is viewed on a TV monitor in which emphasis processing is performed. A moving image signal is encoded using a predetermined prediction image signal, the encoded signal is subjected to predetermined processing, the signal resulting from the processing is quantized, and a moving image signal, which is variable length encoded from the quantized signal, is decoded. Noise is adaptively added to the decoded moving image signal in accordance with a luminance signal of the decoded moving image signal. In this way, unnatural deteriorations caused by digital compression can be made less prominent, so that a natural image can be reproduced from a digital image signal even when it is viewed on a TV monitor in which emphasis processing is performed.

32 Claims, 21 Drawing Sheets

| 1/16 | 1/8 | 1/16 |
|------|-----|------|
| 1/8  | 1/4 | 1/8  |
| 1/16 | 1/8 | 1/16 |

FIG. 3A
(RELATED ART)

| a | b | c |
|---|---|---|
| d | e | f |
| g | h | i |

WHEN 1-BIT DIFFERENCE SIGNAL IS CONVERTED TO ANALOG SIGNAL (WITHOUT EMPHASIS PROCESSING)

WHEN 1-BIT DIFFERENCE SIGNAL IS CONVERTED TO ANALOG SIGNAL (WITH EMPHASIS PROCESSING)

1

REDUCING UNDESIRABLE EFFECTS OF AN EMPHASIS PROCESSING OPERATION PERFORMED ON A MOVING IMAGE BY ADDING A NOISE SIGNAL TO A DECODED UNCOMPRESSED SIGNAL

This application is a continuation of application Ser. No. 08/570,696, filed on Dec. 11, 1995, now abandoned.

BACKGROUND OF THE INVENTION

1. Field of the Invention

The present invention relates to a moving image decoding method and a moving image decoding apparatus, and more particularly, is suitable for use in reproducing moving image signals recorded on a recording medium such as an optical disk, a magnetic tape, or the like to display reproduced moving images on a display unit, or suitable for use in a television conference system, a television telephone system, broadcasting equipment, and so on, wherein moving image signals are transmitted through transmission channels from the transmission side to the reception side such that the reception side receives the moving image signals to display.

2. Description of the Related Art

A system for transmitting moving image signals to remote locations, such as a television conference system, a television telephone system, digital TV broadcasting, and so on, utilizes a line correlation and inter-frame correlation of video signals to compress the moving image signals for encoding in order to efficiently utilize transmission channels. The configuration of a moving image encoding/decoding apparatus for encoding moving image signals for transmission and for decoding transmitted moving image signals is shown in FIG. 1. An encoding unit 1 encodes an input video signal VD and transmits the encoded video signal to a recording medium 3 as a transmission channel. A decoding unit 2 reproduces signals recorded on the recording medium 3, and decodes and outputs the reproduced signals.

In the encoding unit 1, the input video signal VD is inputted to a pre-processing circuit 4. The pre-processing circuit 4 separates the input video signal VD into a luminance signal and a color (color difference signal in this case) signal and supplies the luminance signal and the color signal to A/D (analog-to-digital) convertors 5, 6, respectively. The A/D convertors 5, 6 convert the luminance signal and the color signal being analog signals into respective digital signals. The luminance signal and the color signal which are converted into digital signals are supplied to a pre-filter 7. The pre-filter 7 performs filtering processing to the inputted digital signals, and then supplies the digital signals on a frame memory 8. The frame memory 8 stores the luminance signal in a luminance signal frame memory 8A and the color difference signal in a color difference signal frame memory 8B, respectively.

The pre-filter 7 performs processing for increasing an encoding efficiency and for improving an image quality. This may be, for example, a filter for removing noise, or a filter for limiting a bandwidth. FIG. 2 shows the configuration of a two-dimensional low pass filter as an example of the pre-filter 7. In FIG. 2, a reference letter D designates a one-pixel delay. Also, FIG. 3A shows filter coefficients for this two-dimensional low pass filter, and FIG. 3B shows a 3×3 pixel block which is inputted to the filter. For an objective pixel e, the two-dimensional low pass filter extracts a block of 3×3 pixels around the pixel e. The two-dimensional low pass filter performs the following mathematical operation for the extracted pixel block.

$$\tfrac{1}{16}{\times}a + \tfrac{1}{8}{\times}b + \tfrac{1}{16}{\times}c + \tfrac{1}{8}{\times}d + \tfrac{1}{4}{\times}e + \tfrac{1}{8}{\times}f + \tfrac{1}{16}{\times}g + \tfrac{1}{8}{\times}h + \tfrac{1}{16}{\times}i \qquad (1)$$

The output of this mathematical operation is used as an output value of the filter for the pixel e. Actually, in the pre-filter 7, filtered output values are delivered from an output OUT1, while original pixel values unfiltered are delivered from an output OUT2 after a predetermined amount of delay. In this filter, uniform filtering is always performed irrespective of inputted image signals and irrespective of a state of an associated encoder.

A format convertor 9 converts an image signal stored in the frame memory 8 to data of a predetermined format suitable for inputting to an encoder 10. The data converted to the predetermined format is supplied from the format convertor 9 to the encoder 10, where the data is encoded. An encoding algorithm used herein is arbitrary, an example of which will be described later. The signal encoded by the encoder 10 is outputted therefrom as a bit stream which is recorded, for example, on a recording medium 3.

Data reproduced from the recording medium 3 is supplied to a decoder 11 in the decoding unit 2 for decoding. While a decoding algorithm used in the decoder 11 is arbitrary, it must correspond to the encoding algorithm. An example of the decoder 11 will be described later. The data decoded by the decoder 11 is inputted to a format convertor 12, where it is converted to an output format.

A luminance signal separated from an image signal in the frame format is supplied to and stored in a luminance signal frame memory 13A in a frame memory 13, while a color difference signal is supplied to and stored in a color difference signal frame memory 13B. The luminance signal and the color difference signal respectively read from the luminance signal frame memory 13A and the color difference signal frame memory 13B are supplied to a post-filter 14 for filtering, and then supplied to D/A convertors 15, 16. The D/A convertors 15, 16 convert the supplied luminance signal and color difference signal being digital signals into analog signals respectively, and supply the luminance signal and the color signal which are converted into analog signals to a post-processing circuit 17. Then, the post-processing circuit 17 mixes the supplied luminance signal and color signal with each other. The output video signal is outputted to a display unit (not shown) which may be, for example, a CRT display or the like, and displayed thereon.

The post-filter 14 executes filtering for improving the image quality to alleviate a deteriorated image caused by the encoding. The post-filter 14 may be, for example, a filter for removing block distortion, noise generated near abrupt edges, quantization noise, and so on. While a variety of post-filters are available, a two-dimensional low pass filter similar to that used for the pre-filter 7, as shown in FIG. 2, may be utilized by way of example.

Next, the highly efficient encoding of moving images will be explained. Since moving image data such as video signals or the like contains an extremely large amount of information, an extremely high data transmission speed is required for recording and/or reproducing the moving image data on a recording medium for a long time period. This leads to a requirement of a large magnetic tape or optical disk. Also, even when moving image data is communicated through a transmission channel or used for broadcasting, such an excessively large amount of data causes a problem that existing transmission channels cannot be utilized for communications of the moving image data as it is.

Therefore, for recording video signals on a much smaller recording medium for a long time period or for utilizing video signals for communications and broadcasting, means is indispensable for very efficiently encoding the video signals for recording and for very efficiently decoding read signals which have been encoded. To meet such requirements, highly efficient encoding schemes, utilizing a correlation of video signals, have been proposed, one of which is the MPEG (Moving Picture Experts Group) scheme. This scheme has been discussed and proposed as a standard in ISO-IEC/JTC1/SC2/WG11. Specifically, the MPEG scheme is a hybrid scheme which includes a combination of a motion compensation predictive encoding and a discrete cosine transform (DCT) coding. As an example, the MPEG scheme has been proposed by the present applicant in the specification and the drawings of U.S. application U.S. Pat. No. 5,155,593 (Date of Patent: Oct. 13, 1992).

The motion compensation predictive encoding is a method which utilizes a correlation of image signals in the time axis direction, wherein a currently inputted image is predicted from previously decoded and reproduced signals, and a prediction error occurring in the prediction only is transmitted, thus compressing the amount of information required for the encoding. The DCT coding, in turn, utilizes only an intra-frame two-dimensional correlation possessed by image signals, concentrates signal power on particular frequency components, and only encodes concentrated coefficients to compress the amount of information. For example, in a portion of an image signal presenting a flat pattern, i.e., having a high auto-correlation, DCT coefficients are concentrated in low frequency components. Thus, in this case, coefficients concentrated in the low frequency range only are encoded to compress the amount of information. It should be noted that while an encoder conforming to the MPEG scheme is described in detail as an example, the encoding scheme is not limited to the MPEG scheme, and the discussion given herein may be applied likewise to any arbitrary encoding scheme.

Next, the MPEG scheme is described. When utilizing a line correlation, image signals can be compressed, for example, by the DCT processing or the like. Also, when utilizing an inter-frame correlation, image signals can be further compressed and encoded. FIGS. 4A and 4B represent the principle of highly efficient encoding of moving images utilizing frame correlation. Referring to FIGS. 4A and 4B, when frame images PC1, PC2, PC3 are generated respectively at times t1, t2, t3, by way of example, a difference between the image signals representing the frame images PC1 and PC2 is calculated to generate PC12, while a difference between the image signals representing the frame images PC2 and PC3 is calculated to generate PC23. Generally, since images in temporally adjacent frames do not present a large change, a difference signal generated by calculating the difference therebetween will be a small value. Thus, by encoding this difference signal, the amount of code can be compressed.

However, only with the difference signal transmitted, an original image cannot be restored. Thus, in the MPEG scheme, an image in each frame is assigned to one of three types of pictures, I-picture, P-picture, and B-picture, and image signals representing the three types of pictures are compressively encoded. More specifically, as shown in FIGS. 5A and 5B, image signals of 17 frames including frames F1–F17 are collected as a group of picture (GOP) and treated as one unit of processing. An image signal in the first frame F1 of GOP is encoded as an I-picture, an image signal in the second frame F2 is encoded as a B-picture, and an image signal in the third frame F3 is encoded as a P-picture. The fourth and subsequent frames F4–F17 are processed alternately as a B-picture or a P-picture.

The image signal designated as the I-picture is formed using the image signal for one frame only to encode and transmit it. For the image signal designated as the P-picture, basically as shown in FIG. 5A, a difference between the image signal itself and an image signal of the previous I-picture or B-picture is encoded and transmitted. As the image signal designated the B-picture, basically as shown in FIG. 5B, a difference between the image signal itself and an average value of the previous and next frames is calculated, and the difference is encoded and transmitted.

FIGS. 6A and 6B represent the principle of a moving image signal encoding method. Since the first frame F1 is processed as an I-picture, it is transmitted as it is to a transmission channel as transmitted data F1X (intra-frame encoding). Since the second frame F2 is processed as a B-picture, a difference with an average value of the previous frame F1 and the next frame F3 is calculated, and the difference is transmitted as transmitted data F2X.

There are four types of processing for the B-picture. First processing involves transmitting the original frame F2 as is as the transmitted data F2X, indicated by a dotted arrow SP1 (intra-encoding). This is similar processing to that performed on I-picture. Second processing involves calculating a difference between the B-picture frame F2 and the next frame F3, and the difference is transmitted, as indicated by a dotted arrow SP2 (backward DPCM). Third processing involves transmitting a difference with the previous frame F1, as indicated by a dotted arrow SP3 (forward DPCM). Fourth processing involves calculating a difference with an average value of the previous frame F1 and the next frame F3, and transmitting this difference as transmitted data F2X, as indicated by arrows SP4 (bi-directional DPCM).

Among the four processing methods, the one which most reduces transmitted data is selected. In this event, when difference data is transmitted, a motion vector between the image in the original frame F2 and an image in a frame with which the difference to be transmitted has been calculated (prediction image) is transmitted together with the difference data. The motion vector to be transmitted is x1 which is a motion vector between the frames F1 and F2 for the forward DPCM, x2 which is a motion vector between the frames F3 and F2 for the backward DPCM, or both x1 and x2 for the bi-directional DPCM).

Because the frame F3 is processed as a P-picture, a difference signal between the frame F3 and the temporally preceding frame F1 which is a prediction image of the frame F3 is calculated, as indicated by a dotted arrow SP3. A motion vector x3 is calculated from the frames F3 and F1, and the motion vector x3 is transmitted with the difference signal between frames F3 and F1 as transmitted data F3X (forward DPCM). Alternatively, data in the original frame F3 is transmitted as is as the transmitted data F3X, as indicated by a dotted arrow SP1 (intra-encoding). From the two encoding methods, the one which more reduces the amount of transmitted data is selected, as is the case of the B-picture.

Next, the configuration of an encoder will be described. FIG. 7 shows the configuration of the encoder 10. Image data BD to be encoded, which has been converted to macro blocks by the format convertor circuit 9 (FIG. 1), is inputted to a motion vector detector circuit (MV-DET) 20 in the unit of macro-blocks. Specifically, the format convertor circuit 9 (FIG. 1) divides data in a frame format, which is composed of V lines each including H dots, into N slices each having 16 lines, and further divides each slice into M macro-blocks. Each macro-block is composed of luminance signals corresponding to 16×16 pixels (dots). The luminance signals are further divided into blocks Y[1]–Y[4] each having 8×8 dots. The luminance signals of 16×16 dots correspond to a Cb signal composed of 8×8 dots and a Cr signal composed of 8×8 dots.

The motion vector detector circuit 20 processes image data in each frame as the I-picture, P-picture, or B-picture in accordance with a predetermined sequence. Whether respective images of sequentially inputted frames are processed as the I-, P-, or B-picture has been previously determined. For example, a group of picture including frames F1–F17 as shown in FIGS. 5A and 5B is processed in the order of I, B, P, B, P, . . . , B, P.

Image data in a frame to be processed as the I-picture (for example, frame F1) is transferred from the motion vector detector circuit 20 to and stored in a forward original image area 21A in a frame memory 21. Image data in a frame to be processed as the B-picture (for example, frame F2) is transferred to and stored in an original image area 21B in the frame memory 21. Image data in a frame to be processed as the P-picture (for example, frame F3) is transferred to and stored in a backward image area 21C in the frame memory 21.

At the next timing, operation when an image of a frame to be processed as the B-picture (frame F4) or the P-picture (frame F5) is inputted to the motion vector detector circuit 20, the image data of the first P-picture (frame F3) so far stored in the backward original image area 21C is transferred to the forward original image area 21A. Also, image data of the next B-picture (frame F4) is stored (overwritten) in the original image area 21B, and image data of the next P-picture (frame F5) is stored (overwritten) in the backward original image area 21C. These operations are sequentially repeated.

A signal representing each picture stored in the frame memory 21 is read from the frame memory 21 and supplied to a prediction mode switching circuit (MODE-SW) 22. The prediction mode switching circuit (MODE-SW) 22 performs frame prediction mode processing or field prediction mode processing. Also, a processing unit 24 performs an intra-image prediction, forward prediction, backward prediction, or bi-directional prediction under the control of a prediction determining circuit 23.

Selection from the above-mentioned predictions is made corresponding to a prediction error signal (a difference between a reference image to be processed and a prediction image associated with the reference image). For this purpose, the motion vector detector circuit 20 generates a sum of absolute values of prediction error signals which may be used for this determination. A squared sum may be generated instead.

Here, the frame prediction mode and the field prediction mode in the prediction mode switching circuit 22 will be described. When the frame prediction mode is set, the prediction mode switching circuit 22 outputs four luminance blocks Y[1]–Y[4] supplied from the motion vector detector circuit 20, as they are, to the subsequent processing unit 24. More specifically, in this case, data of lines in an odd field and data of lines in an even field are mixedly included in each luminance block, as shown in FIG. 9A. In the frame prediction mode, the prediction is performed in the unit of four luminance blocks (macro-block) such that one motion vector, corresponds to every four luminance blocks.

On the other hand, in the field prediction mode, the prediction mode switching circuit 22 processes signals composed as shown in FIG. 9A and supplied from the motion vector detector circuit 20, for example, such that luminance blocks Y[1] and Y[2] within the four luminance blocks only include dots on lines in an odd field, while the remaining two luminance blocks Y[3] and Y[4] only include dots on lines in an even field, as shown in FIG. 9B. The four luminance blocks thus reconstructed are outputted to the processing unit 24. In this case, one motion vector corresponds to the two luminance blocks Y[1] and Y[2], and another motion vector corresponds to the remaining two luminance blocks Y[3] and Y[4].

In the frame prediction mode, the color difference signal is supplied to the processing unit 24 in a state that data of lines in an odd field and data of lines in an even field are mixed therein, as shown in FIG. 9A. In the field prediction mode, on the other hand, upper halves (four lines) of the respective color difference blocks Cb, Cr are reserved for color difference signals in an odd field corresponding to the luminance blocks Y[1], Y[2], and lower halves (four lines) of the same are reserved for color difference signals in an even field corresponding to the luminance blocks Y[3], Y[4], as shown in FIG. 9B.

The motion vector detector circuit 20 generates the sum of absolute values of prediction errors for determining which of the intra-image prediction, forward prediction, backward prediction, and bi-directional prediction is performed in the prediction determining circuit 23. As the sum of absolute values of prediction errors in the intra-image prediction, a difference between an absolute value $|\Sigma A_{ij}|$ of a sum $\Sigma A_{ij}$ of signals $A_{ij}$ in a macro-block of the reference image and a sum $\Sigma|A_{ij}|$ of absolute values $|A_{ij}|$ of signals $A_{ij}$ in a macro-block of a prediction image is calculated. Also, as the sum of absolute values of prediction errors in the forward prediction, a sum $\Sigma|A_{ij}-B_{ij}|$ of absolute values $|A_{ij}-B_{ij}|$ of differences $A_{ij}-B_{ij}$ between signals $A_{ij}$ in the macro-block of the reference signal and signals $B_{ij}$ in the macro-block of the prediction image is calculated.

In addition, the motion vector detector circuit 20 also calculates the sums of absolute values of prediction errors in the backward prediction and the bi-directional prediction similar to the forward prediction (changing the prediction image to another one which is not used in the forward prediction). These sums of absolute values are supplied to the prediction determining circuit 23 which selects the smallest one from the sums of absolute values of prediction errors in the forward prediction, backward prediction, and bi-directional prediction, as the sum of absolute values of prediction errors in an inter-prediction.

The prediction determining circuit 23 also compares the sum of absolute values of prediction errors in the inter-image prediction with a sum of absolute values of prediction errors in the intra-image prediction to select the smaller one, and chooses a mode corresponding to the selected sum of absolute values as a prediction mode (P-mode). In summary, an intra-image prediction mode is set when the sum of absolute values of prediction errors in the intra-image prediction is smaller. When the sum of absolute values of prediction errors in the inter-prediction is smaller, the mode presenting the smallest corresponding sum of absolute values is selected from the forward prediction, backward prediction, and bi-directional prediction modes.

In this way, the prediction-mode switching circuit 22 supplies signals in macro-blocks of the reference image in the configuration as shown in FIGS. 9A and 9B corresponding to a mode selected by the prediction determining circuit 23 from the frame or field prediction mode, to the processing unit 24. In addition, the motion vector detector circuit 20 detects a motion vector between a prediction image corresponding to the prediction mode (P-MODE) selected by the prediction determining circuit 23 from the four prediction modes and the reference image, and outputs the detected motion vector to a variable length encoding circuit (VLC) 25 and a motion compensation circuit (M-COMP) 43. As described above, selected as the motion vector is the one which presents the smallest sum of absolute values of prediction errors corresponding thereto.

The prediction determining circuit 23 sets the intra-frame (image) prediction mode (a mode which does not perform motion compensation) as the prediction mode when the motion vector detector circuit 20 is reading I-picture image data from the forward original image area 21A, and switches a switch S in the processing unit 24 to a contact a. This causes the I-picture image data to be inputted to a DCT mode switching circuit (DCT CTL) 27. The DCT mode switching circuit (DCT CTL) 27 rearranges data of four luminance blocks into a state in which lines in an odd field and lines in an even field are mixed (frame DCT mode) or into a state in which the lines in the odd field and the lines in the even field are separated (field DCT mode) as shown in FIGS. 10A and 10B, and outputs the data rearranged in one of the two states to a DCT circuit 28.

More specifically, the DCT mode switching circuit 27 compares an encoding efficiency provided when DCT processing is performed on the mixed odd-field and even-field data (frame DCT mode) with an encoding efficiency provided when the DCT processing is performed on the separated odd-field and even-field data (field DCT mode), in order to select a mode presenting a higher encoding efficiency. For example, as shown in FIG. 10A, the DCT mode switching circuit 27 calculates a difference between a signal on each line in the odd field and a signal on a line in the even field adjacent thereto in the frame DCT mode in which lines in an odd field and lines in even field are mixed, and derives a sum or squared sum of absolute values of thus calculated differences.

Also, the DCT mode switching circuit 27 calculates a difference between every two adjacent lines in the odd field and a difference between every two adjacent lines in the even field in the field DCT mode in which lines in an odd field are separated from lines in an even field, as shown in FIG. 10B, and derives respective sums or squared sums of absolute values of the differences. Then, the DCT mode switching circuit 27 compares both the sums of the absolute values with each other to set a DCT mode corresponding to the smaller value. Specifically, when the former is smaller, the frame DCT mode is set. Conversely, when the latter is smaller, the field DCT mode is set. Then, the DCT mode switching circuit 27 outputs the data in a format corresponding to a selected DCT mode to the DCT circuit 27, and outputs a DCT flag (DCT-FLG) indicative of the selected DCT mode to the variable length encoder circuit (VLC) 25 and to a DCT block change circuit (motion compensation circuit) 26, later described.

As is apparent from the comparison of the prediction mode (FIGS. 9A and 9B) in the prediction mode switching circuit 22 with the DCT mode (FIGS. 10A and 10B) in the DCT mode switching circuit 27, the respective modes in these two circuits 22, 27 have substantially the same data format for the luminance block. When the prediction mode switching circuit 22 selects the frame prediction mode (the mode in which lines in an odd field and lines in an even field are mixed), the DCT mode switching circuit 27 is likely to select the frame DCT mode (the mode in which lines in an odd field and lines in an even field are mixed).

On the other hand, when the prediction mode switching circuit 22 selects the field prediction mode (the mode in which data on an odd field is separated from data on an even field), the DCT mode switching circuit 27 is likely to select the field DCT mode (the mode in which data on an odd field is separated from data on an even field). However, this is not always the case. The prediction mode switching circuit 22 determines a mode so as to reduce the sum of absolute values of prediction errors, while the DCT mode switching circuit 27 determines a mode so as to improve the encoding efficiency.

I-picture image data outputted from the DCT mode switching circuit 27 is inputted to the DCT circuit 28. The DCT circuit 28 DCT processes it to be transformed into DCT coefficients. The DCT coefficients are inputted to a quantization circuit (Q) 29 to be quantized by a quantization scale (QS) corresponding to a data storing amount (indicated by a quantization control signal (B-FULL)) of a transmission buffer (BUFFER) 30, and then inputted to the variable length encoding circuit 25.

The variable length encoding circuit 25, corresponding to the quantization scale (QS) supplied by the quantization circuit 29, transforms image data supplied from the quantization circuit 29 (in this case, the I-picture image data) into variable length codes such as Huffman codes, by way of example, and outputs the transformed variable length codes to the transmission buffer 30. The variable length encoding circuit 25 is also supplied with a prediction mode signal (the mode (P-MODE) indicating which of the intra-image prediction, forward prediction, backward prediction, and bi-directional prediction has been set), a motion vector (MV) from the motion vector detector circuit 20, a prediction flag (a flag (P-FLG) indicating which of the frame prediction mode and the field prediction mode has been set) from the prediction mode switching circuit 22, and a DCT flag (a flag (DCT-FLG) indicating which of the frame DCT mode or the field DCT mode has been set) outputted from the DCT mode switching circuit 27, all of which are also transformed into variable length codes by the variable length encoding circuit 25.

The transmission buffer 30 temporarily stores inputted data and outputs an amount of data corresponding to its storing amount to the quantization circuit 29. When an amount of data remaining therein increases to an acceptable upper limit value, the transmission buffer 30 generates a quantization control signal (B-FULL) to instruct the quantization circuit 29 to provide a larger quantization scale (QS), thus reducing an amount of quantized data supplied to the transmission buffer 20. Conversely, when the amount of data remaining therein decreases to an acceptable lower limit value, the transmission buffer 30 generates the quantization control signal (B-FULL) to instruct the quantization circuit 29 to provide a smaller quantization scale (QS), thus increasing an amount of quantized data supplied thereto. In this way, the transmission buffer 30 is prevented from being overflowed with data and from being underflowed. Data stored in the transmission buffer 30 is read out at predetermined interval onto a transmission channel, and then recorded, for example, on a recording medium 3.

The data of I-picture outputted from the quantization circuit 29 is inputted to an inverse quantization (IQ) circuit 31, where it is inversely quantized corresponding to the quantization scale (QS) supplied from the quantization circuit 29. The output of the inverse quantization circuit 31 is inputted to an inverse DCT (IDCT) circuit 32 for inverse DCT processing. Then, the blocks constituting the data are supplied to the block change circuit (BLOCK CHANGE) 33. The block change circuit 33 rearranges the blocks in accordance with each DCT mode (frame/field). The output of the block change circuit 33 is supplied through an operating unit 34 to a forward prediction image area (F-P) 35A in a frame memory 35 and stored therein.

When the motion vector detector circuit 20 processes image data of respective frames sequentially inputted thereto, for example, as a sequence of I-, B-, P-, B-, P-, B-, . . . pictures, the motion vector detector circuit 20, after processing image data of the first inputted frame as an I-picture, processes image data of the next but one frame as a P-picture before processing image data of the next inputted frame as a B-picture. This is because the B-picture involves the backward prediction, so that it cannot be decoded unless the subsequent P-picture as a backward prediction image is previously prepared.

Thus, the motion vector detector circuit 20, after processing the first I-picture, starts processing the P-picture image data stored in the backward original image area 21C. In this processing, the sum of absolute values of inter-frame differences (prediction errors) in the unit of micro-blocks is supplied from the motion vector detector circuit 20 to the prediction mode switching circuit 22 and to the prediction determining circuit 23, similarly to the above-mentioned case. The prediction mode switching circuit 22 and the prediction determining circuit 23, in response to the sum of absolute values of the prediction errors in the macro-blocks of the P-picture, set one of the frame and field prediction modes and a prediction mode from the intra-image prediction, forward prediction, backward prediction, and bi-directional prediction, respectively.

The processing unit 24 changes the switch S to the contact a, as mentioned above, when the intra-frame prediction mode is set. This causes the data to be transmitted to a transmission channel through the DCT mode switching circuit 27, DCT circuit 28, quantization circuit 29, variable length encoding circuit 25, and transmission buffer 30, similarly to I-picture data. Also, the data is supplied to and stored in a backward prediction image area (B-P) 35B in the frame memory 35 through the inverse quantization circuit 31, inverse DCT circuit 32, block change circuit 33, and operating unit 34.

In the forward prediction mode, the switch S in the processing unit 24 is changed to a contact b to read image data stored in the forward prediction image area 35A in the frame memory 35 (I-picture image data in this case), and the read image data is motion compensated by the motion compensation circuit 26 corresponding to a motion vector outputted from the motion vector detector circuit 20. More specifically, when the setting of the forward prediction mode is instructed by the prediction determining circuit 23, the motion compensation circuit 26 shifts a read address of the forward prediction image area 35A from an address location corresponding to the position of a macro-block currently outputted by the motion vector detector circuit 20 by a portion corresponding to the motion vector, and reads data from the shifted address location to generate prediction image data.

The prediction image data outputted from the motion compensation circuit 26 is supplied to an operating unit 24A. The operating unit 24A subtracts, from data of a macro-block of the reference image supplied from the prediction mode switching circuit 22, prediction image data corresponding to this macro-block supplied from the motion compensation circuit 26, to output the difference therebetween (prediction error). This difference data is delivered to the transmission channel through the DCT mode switching circuit 27, DCT circuit 28, quantization circuit 29, variable length encoding circuit 25, and transmission buffer 20. Also, the difference data is locally decoded by the inverse quantization circuit 31 and the inverse DCT circuit 32, and inputted to the operating unit 34 through the block change circuit 33.

The operating unit 34 is also supplied with the same prediction image data supplied to the operating unit 24A. The operating unit 34 adds the prediction image data outputted from the motion compensation circuit 26 to the difference data outputted from the inverse DCT circuit 32. This addition results in generating the image data of the original (decoded) P-picture. This P-picture image data is supplied to and stored in the backward prediction image area 35B in the frame memory 35.

The motion vector detector circuit 20 performs the processing on a B-picture, after I-picture and P-picture data have been stored in the forward prediction image area 35A and the backward prediction image area 35B in the frame memory 35, respectively, as described above. The prediction mode switching circuit 22 and the prediction determining circuit 23 set one of the frame and field modes corresponding to the magnitude of the sum of absolute values of differences between frames in the unit of macro-blocks, and set the prediction mode to either of the intra-frame prediction mode, forward prediction mode, backward prediction mode, or bi-directional prediction mode. As described above, when the intra-frame prediction mode or the forward prediction mode is set, the switch S in the processing unit 24 is changed to the contact a or b. In this event, similar processing to that on the P-picture is performed on the B-picture, and the B-picture data is transmitted.

When the backward prediction mode or the bi-directional prediction mode is set, the switch S in the processing unit 24 is changed to a contact c or d, respectively. In the back prediction mode, where the switch S is connected to the contact c, image data stored in the backward prediction image area 35B in the frame memory 35 (P-picture image data in this case) is read out and motion compensated by the motion compensation circuit 26 corresponding to a motion vector outputted by the motion vector detector circuit 20.

More specifically, when the setting of the backward prediction mode is instructed by the prediction determining circuit 23, the motion compensation circuit 26 shifts a read address of the backward prediction image area 35B from an address location corresponding to the position of a macro-block currently outputted by the motion vector detector circuit 20 by a portion corresponding to the motion vector, and reads data from the shifted address location to generate prediction image data.

The prediction image data outputted from the motion compensation circuit 26 is supplied to an operating unit 24B. The operating unit 24B subtracts the prediction image data supplied from the motion vector detector circuit 20 from data of a macro-block of the reference image supplied from the prediction mode switching circuit 22 to output the difference therebetween. This difference data is delivered to the transmission channel through the DCT mode switching circuit 27, DCT circuit 28, quantization circuit 29, variable length encoding circuit 25, and transmission buffer 20.

In the bi-directional prediction mode, where the switch S is connected to the contact d, image data stored in the forward prediction image area 35A in the frame memory 35 (I-picture image data in this case) and image data stored in the backward prediction image area 35B in the frame memory 35 (P-picture image data in this case) are read out. Then these read image data are motion compensated by the motion compensation circuit 26 corresponding to a motion vector outputted from the motion vector detector circuit 20.

More specifically, when the setting of the bi-directional prediction mode is instructed by the prediction determining circuit 23, the motion compensation circuit 26 shifts a read address of each of the forward prediction image area 35A and the backward prediction image area 35B from an address location corresponding to the position of a macro-block currently outputted by the motion vector detector circuit 20 by a portion corresponding to each of the associated motion vectors (two motion vectors for the forward prediction image and for the backward prediction image, in this case), and reads data from each of the shifted address locations to generate prediction image data.

The prediction image data outputted from the motion compensation circuit 26 is supplied to an operating unit 24C. The operating unit 24C subtracts an average value of the prediction image data supplied from the motion compensation circuit 26 from data of a macro-block of the reference image supplied from the motion vector detector circuit 20 to output the difference therebetween. This difference data is delivered to the transmission channel through the DCT mode switching circuit 27, DCT circuit 28, quantization circuit 29, variable length encoding circuit 25, and transmission buffer 20. Since the B-picture image is not used as a prediction image for any other image, it is not stored in the frame memory 35.

It should be noted herein that in the frame memory 35, the forward prediction image area 35A and the backward prediction image area 35B may be switched as required. With this bank switching capability, image data stored in the forward prediction image area 35A or in the backward prediction image area 35B may be switched to be outputted as a forward prediction image or as a backward prediction image for a predetermined reference image.

While the above description has been made mainly on the luminance block, the color difference block is likewise processed and transmitted in the unit of macro-blocks shown in FIGS. 9A, 9B and 10A and 10B. However, a motion vector used for processing the color difference block is a motion vector for a corresponding luminance block divided by two in the vertical and horizontal directions.

Next, the decoder 11 will be described. FIG. 11 shows the configuration of the decoder 11. Encoded image data transmitted through a transmission channel (a recording medium 3) is received by a receiver circuit (not shown), reproduced by a reproducing apparatus, temporarily stored in a reception buffer (BUFFER) 40, and then supplied to a variable length decoding circuit (IVLC) 42 in a decoding circuit 41. The variable length decoding circuit 42 variable length decodes data supplied from the reception buffer 40, and supplies a motion vector (MV), a prediction mode (P-MODE) signal, and a prediction flag (P-FLG) to a motion compensation circuit (M-COMP) 43. The variable length decoding circuit 42 also outputs a DCT flag (DCT-FLG) to an inverse block change circuit (BLOCK CHANGE) 44, a quantization scale (QS) to an inverse quantization circuit (IQ) 45. Decoded image data is outputted to the inverse quantization circuit 45.

The inverse quantization circuit 45 inversely quantizes image data supplied from the variable length decoding circuit 42 in accordance with a quantization scale (QS) also supplied from the variable length decoding circuit 42, and outputs the resulting data to an inverse DCT circuit (IDCT) 46. Data (DCT coefficients) outputted from the inverse quantization circuit 45 is subjected to inverse DCT processing in the inverse DCT circuit 46, and supplied to an operating unit 47 through the inverse block change circuit 44. When the image data supplied from the inverse DCT circuit 46 is I-picture data, the data is outputted from the operating unit 47 as well as is supplied to and stored in a forward prediction image area (F-P) 48A in a frame memory 48 in order to generate prediction image data for image data subsequently inputted to the operating unit 47 (P-picture or B-picture data). This data is further outputted to a data format convertor circuit 12.

When the image data supplied from the inverse DCT circuit 46 is P-picture data which uses image data in the previous frame as prediction image data and is data in the forward prediction mode, image data in the previous frame (I-picture data) stored in the forward prediction image area 48A in the frame memory 48 is read out, and motion compensated by the motion compensation circuit 43 corresponding to a motion vector outputted from the variable length decoding circuit 42. Then, the motion compensated image data is added to the image data supplied from the inverse DCT circuit 46 (difference data) in the operating unit 47 which outputs the resulting sum. The sum data, i.e., decoded P-picture data is supplied to and stored in a backward prediction image area (B-P) 48B in the frame memory 48 in order to generate prediction image data for image data subsequently inputted to the operating unit 47 (B-picture or P-picture data).

Data in the intra-image prediction mode, even if it is P-picture data, is not particularly processed in the operating unit 47 as is the case of the I-picture data, and stored as it is in a backward prediction image area 48B in the frame memory 48. Since this P-picture is to be displayed subsequent to the next B-picture, it is not yet outputted to the format convertor circuit 12 at this time (a P-picture inputted after a B-picture is processed and transmitted prior to the B-picture, as described above).

When image data supplied from the inverse DCT circuit 46 is B-picture data, I-picture image data stored in the forward prediction image area 48A in the frame memory 48 (for the forward prediction mode), P-picture image data stored in the backward prediction image area 48B (for the backward prediction mode), or both of the image data (for the bi-directional prediction mode) are read out corresponding to the prediction mode signal supplied from the variable length decoding circuit 42. Read image data is motion compensated in the motion compensation circuit 43 corresponding to a motion vector outputted from the variable length decoding circuit 42 to generate a prediction image. However, when the motion compensation is not required in the motion compensation circuit 43 (in the case of the intra-image prediction mode), no prediction image is generated.

The data motion compensated by the motion compensation circuit 43 in this way is added to the image data outputted from the inverse DCT circuit 46 in the operating unit 47. This addition output is supplied to the format convertor circuit 12. Since this addition output is B-picture data and is not utilized for generating a prediction image for any other image, it is not stored in the frame memory 48. After the B-picture image is outputted, P-picture image data stored in the backward prediction image area 48B in the frame memory 48 is read out and supplied to the operating unit 47 through the motion compensation circuit 43. It should be noted that motion compensation is not performed on this P-picture image data.

While the decoder 11 shown in FIG. 11 does not include circuits corresponding to the prediction mode switching circuit 22 and the DCT mode switching circuit 27 in the encoder 10 shown in FIG. 7, the processing corresponding to those circuits, i.e., the processing for restoring, as required, from the format in which odd-field and even-field line signals are separated from each other to the original format in which the odd-field and even-field line signals are mixed, is carried out by the motion compensation circuit 43. Also, while the above description has been made on the processing on the luminance signal, the color difference signal is likewise processed. However, a motion vector used for processing the color difference signal is a motion vector for a corresponding luminance signal divided by two in the vertical and horizontal directions.

Generally, a TV monitor is provided with a filter for emphasizing an image signal (emphasis processing) in order to improve an impression given by an image reproduced from the image signal. There are a variety of such emphasis processing filters including, for example, a filter for emphasizing high frequency components of an image signal such as a high pass filter, a filter for amplifying the amplitude of an image signal (contrast filter), and a filter for converting a contrast gradation.

An output signal to a TV monitor is an analog signal, so that the above-mentioned emphasis processing is carried out after a digital signal is converted to an analog signal. As shown in FIG. 12, a digital signal inputted to a TV monitor 50 is converted to an analog signal by a D/A convertor 51 and supplied to an emphasis filter 52. The emphasis filter 52 performs emphasis processing of the analog signal and supplies to a display unit 53. The display 53 displays supplied image signal. When an input signal is an analog signal, it is inputted directly to the emphasis filter 52. The emphasis filter 52 performs emphasis processing on the supplied analog signal and supplied to the display 53. The display 53 displays the supplied image signal thereon.

However, the emphasis filter 52 as described above not only emphasizes an image signal for improving a visual impression but also emphasizes noise included in the image signal. Therefore, with an image including much noise. the emphasis processing causes the noise to be more prominent in the reproduced image, thus giving a bad visual impression.

Particularly, in contrast with noise in analog image signals mainly including random noise such as white noise, noise in digital image signals is such that is block distortion, quantization noise (mosquito noise) near edges, and so on, and presents a high correlation of the noise locally generated itself. Thus, in comparison with an image in which white noise (analog image signal) is emphasized, noise in a digital image signal (deterioration), when emphasized, gives a considerably bad impression, in other words, an unnatural impression.

In addition, a digital image signal is generally quantized in eight bits, and the emphasis processing will result in a wider difference between a logic "0" level and a logic "1" level of each bit, as shown in FIGS. 14A, 14B. Thus, an emphasized digital image signal (FIG. 14B) has a larger level difference of the bit than a digital image signal without emphasis (FIG. 14A). This level difference may be viewed in a reproduced image, for example, as a pseudo-outline.

If a digitally compressed image is viewed on a TV monitor in which the emphasis processing is performed as described above, noise (deterioration) caused by compression is also emphasized on a reproduced image to give a worse impression or an unnatural impression to a viewer.

SUMMARY OF THE INVENTION

The present invention has been made in view of the foregoing, and its object is to provide a moving image decoding method and a moving image decoding apparatus which are capable of reproducing a natural image even when a digital image signal is reproduced on a TV monitor in which the emphasis processing is performed on the digital image signal.

The foregoing object and other objects of the invention have been achieved by the provision of a moving image decoding method for decoding a compressively encoded moving image signal, wherein the compressively encoded moving image signal is received, thus compressively encoded and received moving image signal is decoded, and noise is adaptively added to the decoded moving image signal in accordance with a luminance signal of the decoded moving image signal. In this way, unnatural deteriorations caused by digital compression can be made less prominent, so that a natural image can be reproduced even when it is viewed on a TV monitor in which emphasis processing is performed.

Further, in the present invention, a moving image decoding method for decoding a compressively encoded moving image signal, wherein the compressively encoded moving image signal is received, thus compressively encoded and received moving image signal is decoded, a flatness representing a smoothness of luminance change is calculated for the decoded moving image signal, and noise is adaptively added to the decoded moving image signal in accordance with the resulting flatness. In this way, unnatural deteriorations caused by digital compression can be made less prominent, so that a natural image can be reproduced even when it is viewed on a TV monitor in which emphasis processing is performed.

Further, in the present invention, a moving image decoding method for decoding a compressively encoded moving image signal, wherein the compressively encoded moving image signal is received, thus compressively encoded and received moving image signal is decoded, a quantization scale used when the moving image signal was encoded is received, and noise is adaptively added to the decoded moving image signal in accordance with the quantization scale. In this way, unnatural deteriorations caused by digital compression can be made less prominent, so that a natural image can be reproduced even when it is viewed on a TV monitor in which emphasis processing is performed.

Further, in the present invention, a moving image decoding apparatus for decoding a compressively encoded moving image signal, comprising: means for receiving the compressively encoded moving image signal; means for decoding thus compressively encoded and received moving image signal; and means for adaptively adding noise to the decoded moving image signal in accordance with a luminance signal of the decoded moving image signal. In this way, unnatural deteriorations caused by digital compression can be made less prominent, so that a natural image can be reproduced even when it is viewed on a TV monitor in which emphasis processing is performed.

Further, in the present invention, a moving image decoding apparatus for decoding a compressively encoded moving image signal, comprising: means for receiving the compressively encoded moving image signal; means for decoding thus compressively encoded and received moving image signal; means for calculating a flatness representing a smoothness of luminance change for the decoded moving image signal; and means for adaptively adding noise to the decoded moving image signal in accordance with a flatness of the decoded moving signal. In this way, unnatural deteriorations caused by digital compression can be made less prominent, so that a natural image can be reproduced even when it is viewed on a TV monitor in which emphasis processing is performed.

Further, in the present invention, a moving image decoding apparatus for decoding a compressively encoded moving image signal, comprising: means for receiving the compressively encoded moving image signal; means for decoding thus compressively encoded and received moving image signal; means for receiving a quantization scale used when the moving image signal was encoded; and means for adaptively adding noise to the decoded moving image signal in accordance with the quantization scale. In this way, unnatural deteriorations caused by digital compression can be made less prominent, so that a natural image can be reproduced even when it is viewed on a TV monitor in which emphasis processing is performed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A and 3B are schematic diagrams explaining coefficients of the two-dimensional low pass filter of FIG. 2;

FIG. 19 is a schematic diagram explaining a flatness which represents a smoothness of a luminance change;

DETAILED DESCRIPTION OF THE EMBODIMENT

Preferred embodiments of the present invention will be described with reference to the accompanying drawings:

In a digital image signal, deteriorations, particularly pseudo-outlines, are most likely to occur in a flat portion of an image which presents a low luminance and a smooth luminance change, and the deteriorations are visually prominent in such a portion. To make less prominent unnatural deteriorations occurred by digital-compression, the present invention controls the amount of noise to be added to a decoded moving image signal in a post-filter of a decoding unit. Thereby, the present invention can make less prominent unnaturally deteriorated image portions caused by digital-compression even when a moving image signal subjected to digital compression processing is displayed on a TV monitor performing emphasis processing.

Figure 1:
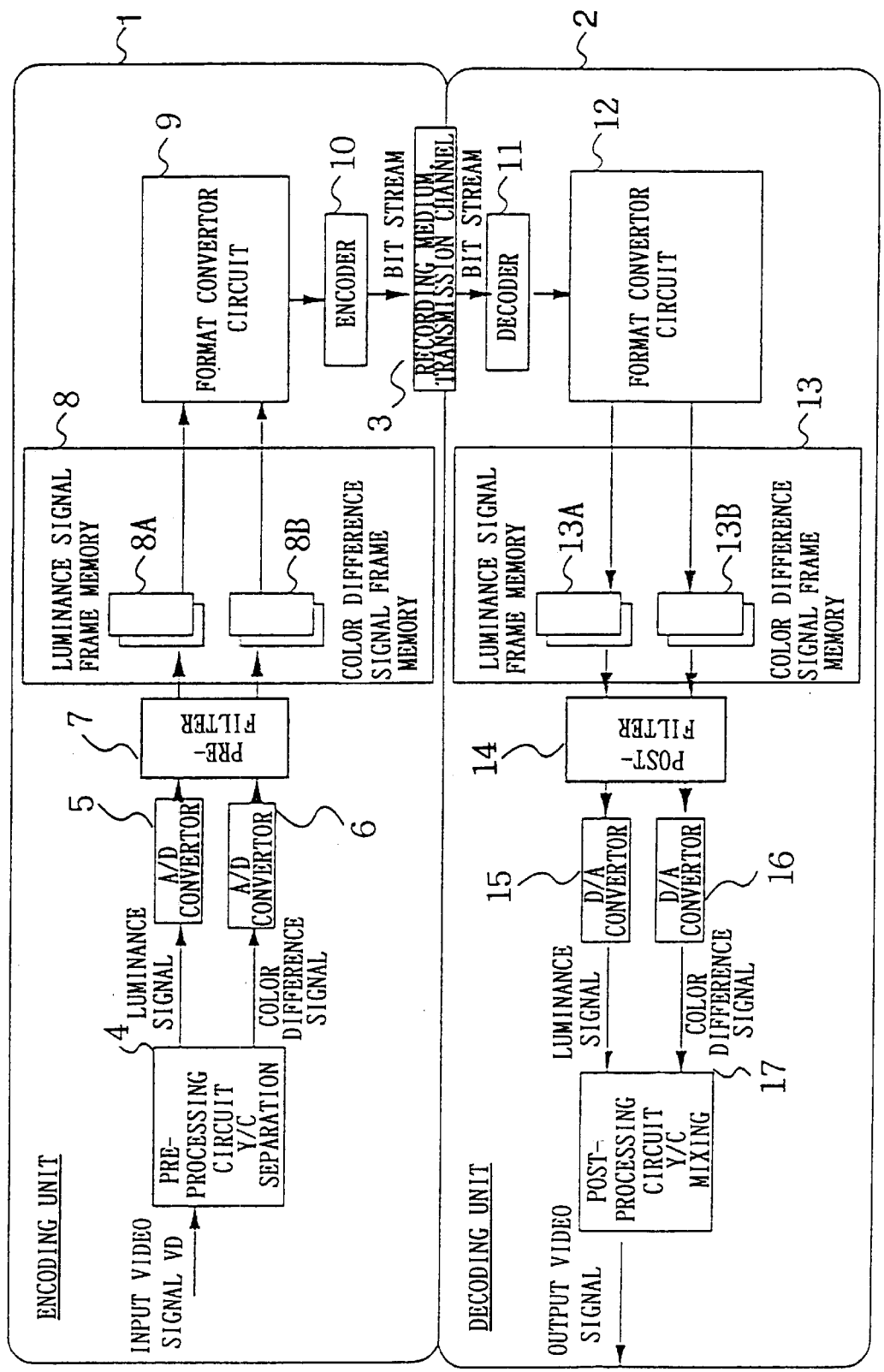
FIG. 1 is a block diagram showing the configuration of a moving image encoding/decoding apparatus.
Figure 2:
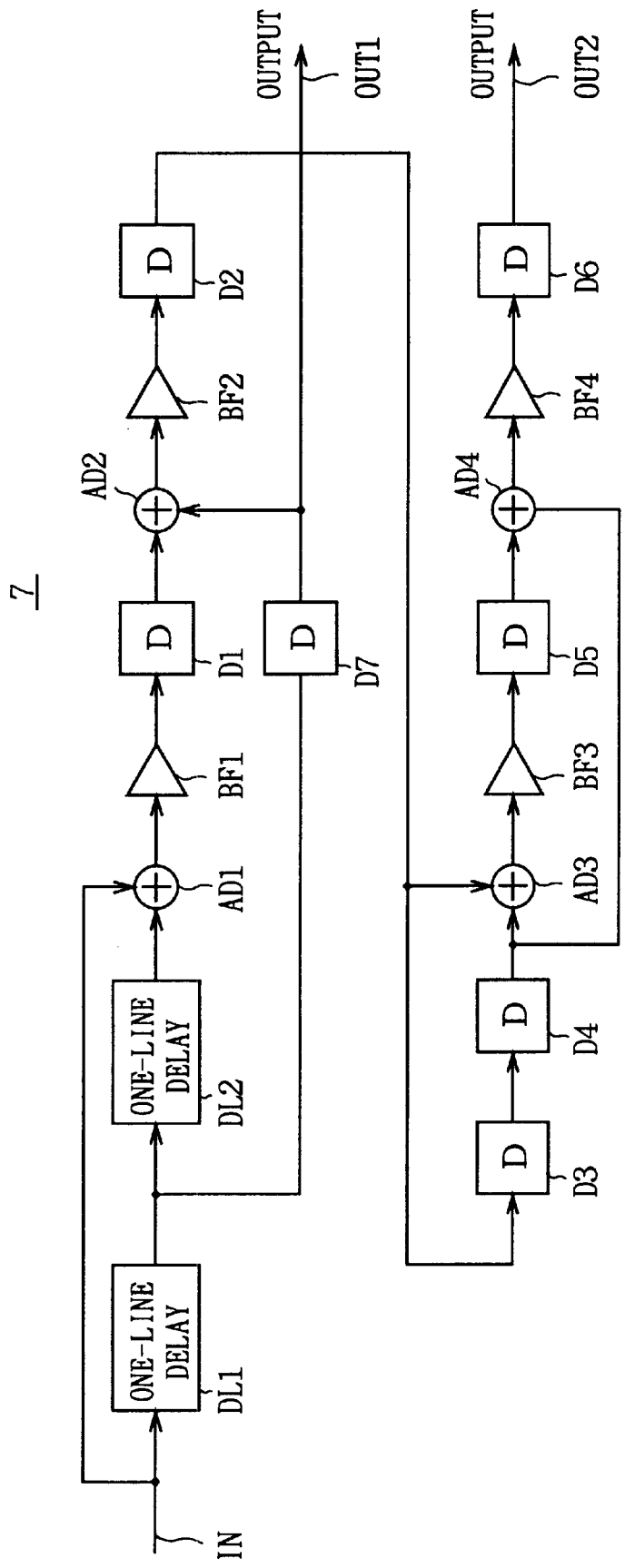
FIG. 2 is a block diagram showing the configuration of a two-dimensional low pass filter used as a pre-filter/post-filter in the moving image encoding/decoding apparatus of FIG. 1.
Figures 4A, 4B:
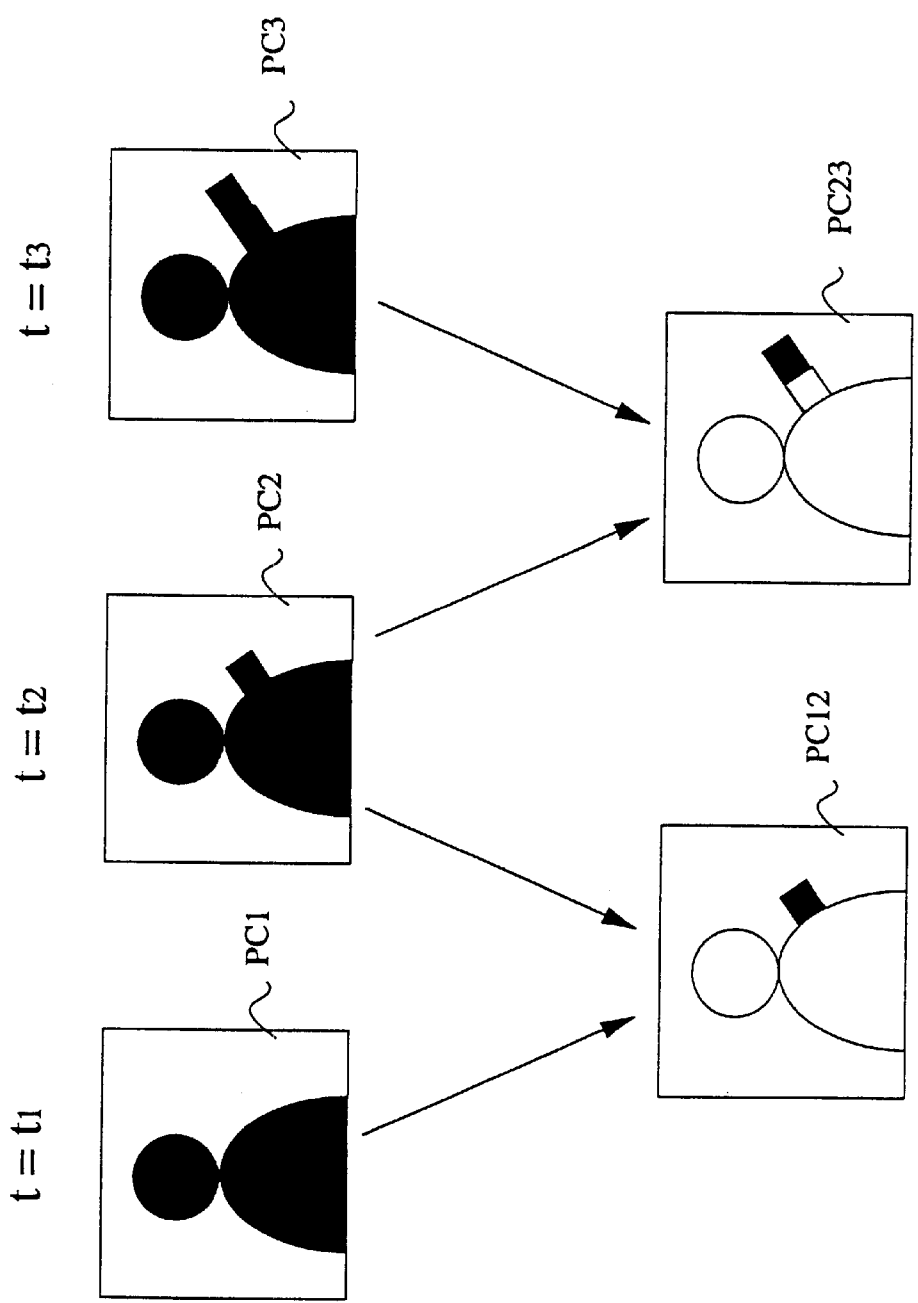
FIGS. 4A and 4B are schematic diagrams explaining the principle of a highly efficient encoding of a moving image signal utilizing a frame correlation.
Figures 5A, 5B:
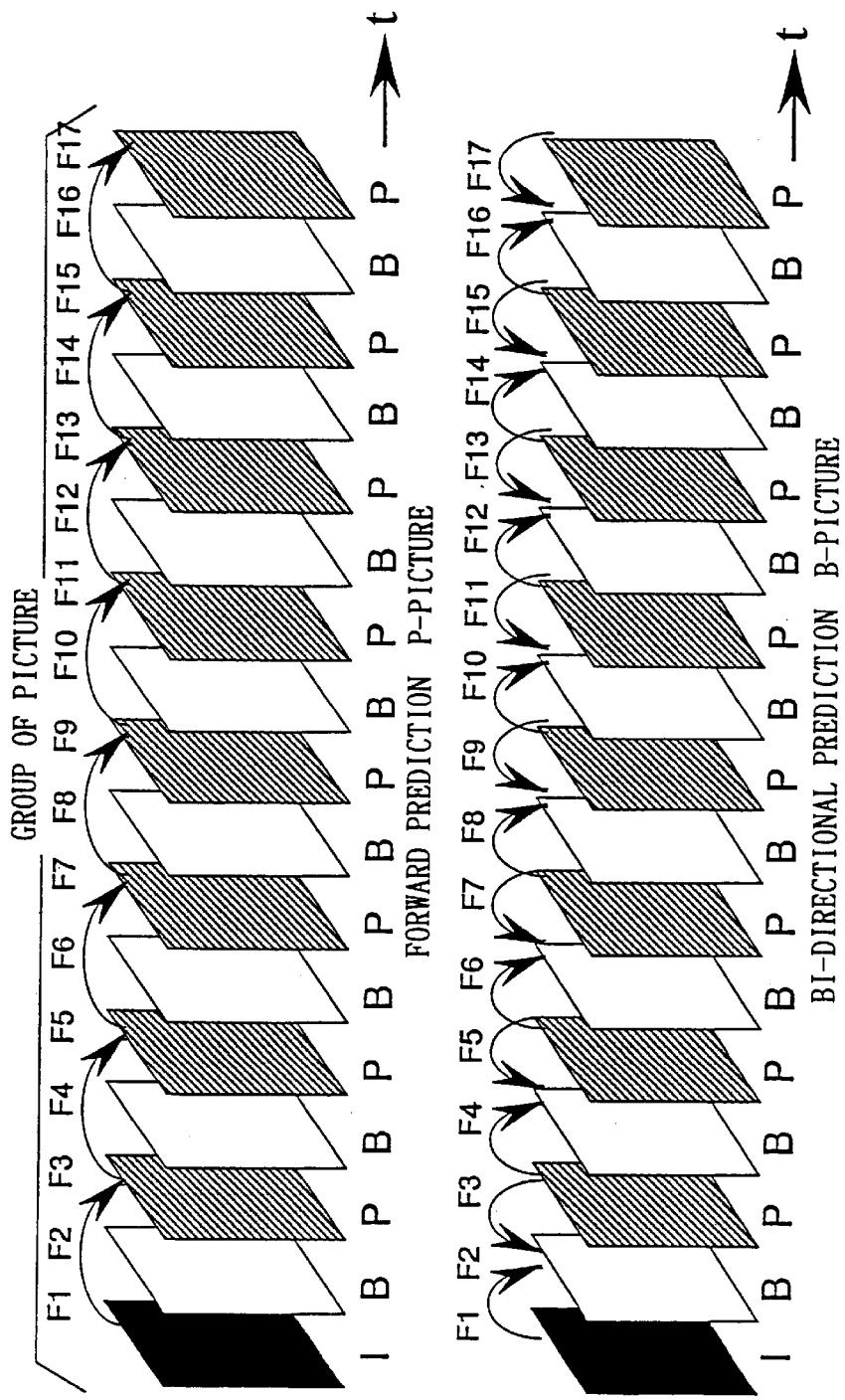
FIGS. 5A and 5B are schematic diagrams explaining picture types for compressing a moving image signal.
Figures 6A, 6B:
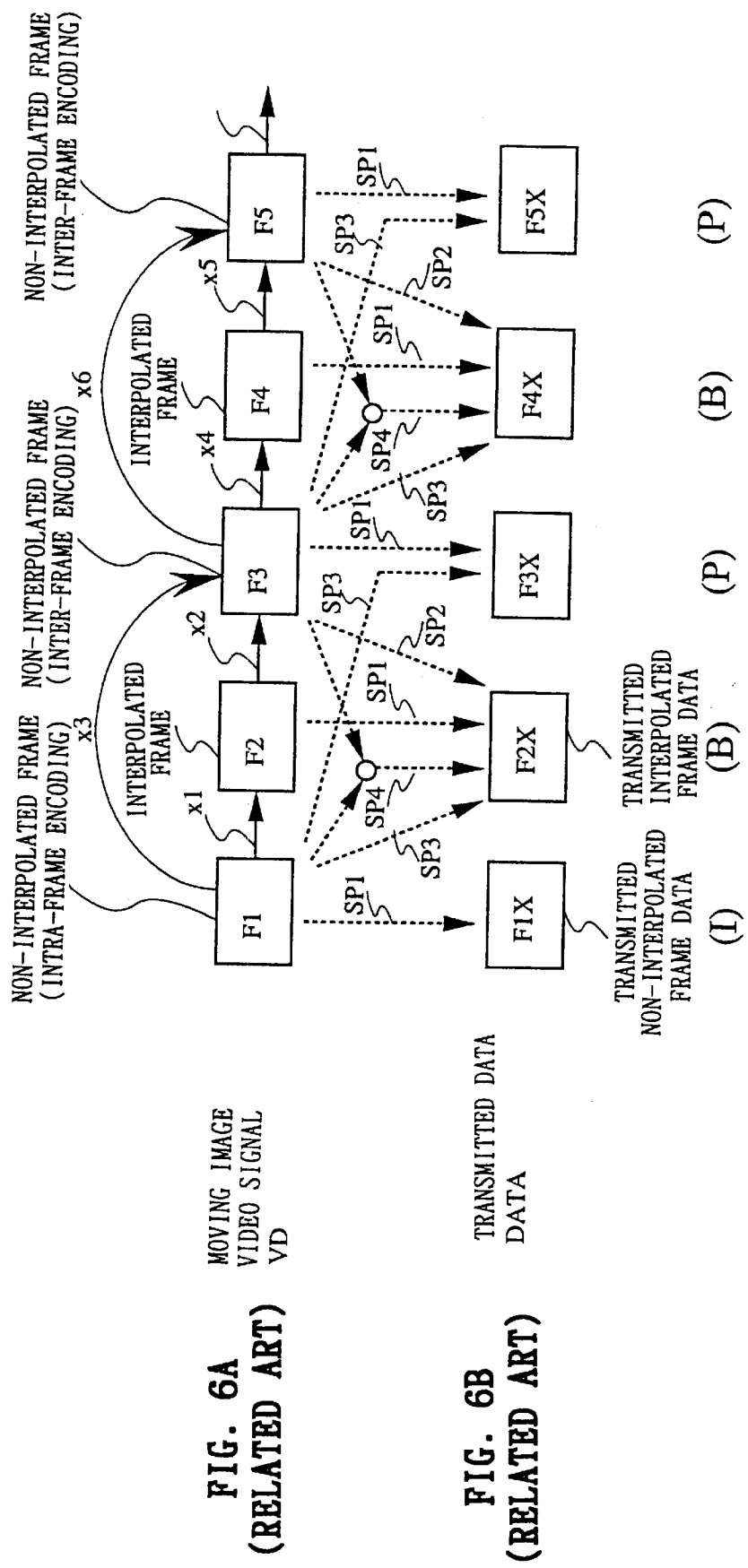
FIGS. 6A and 6B are schematic diagrams explaining the principle of a moving image signal encoding method.
Figure 7:
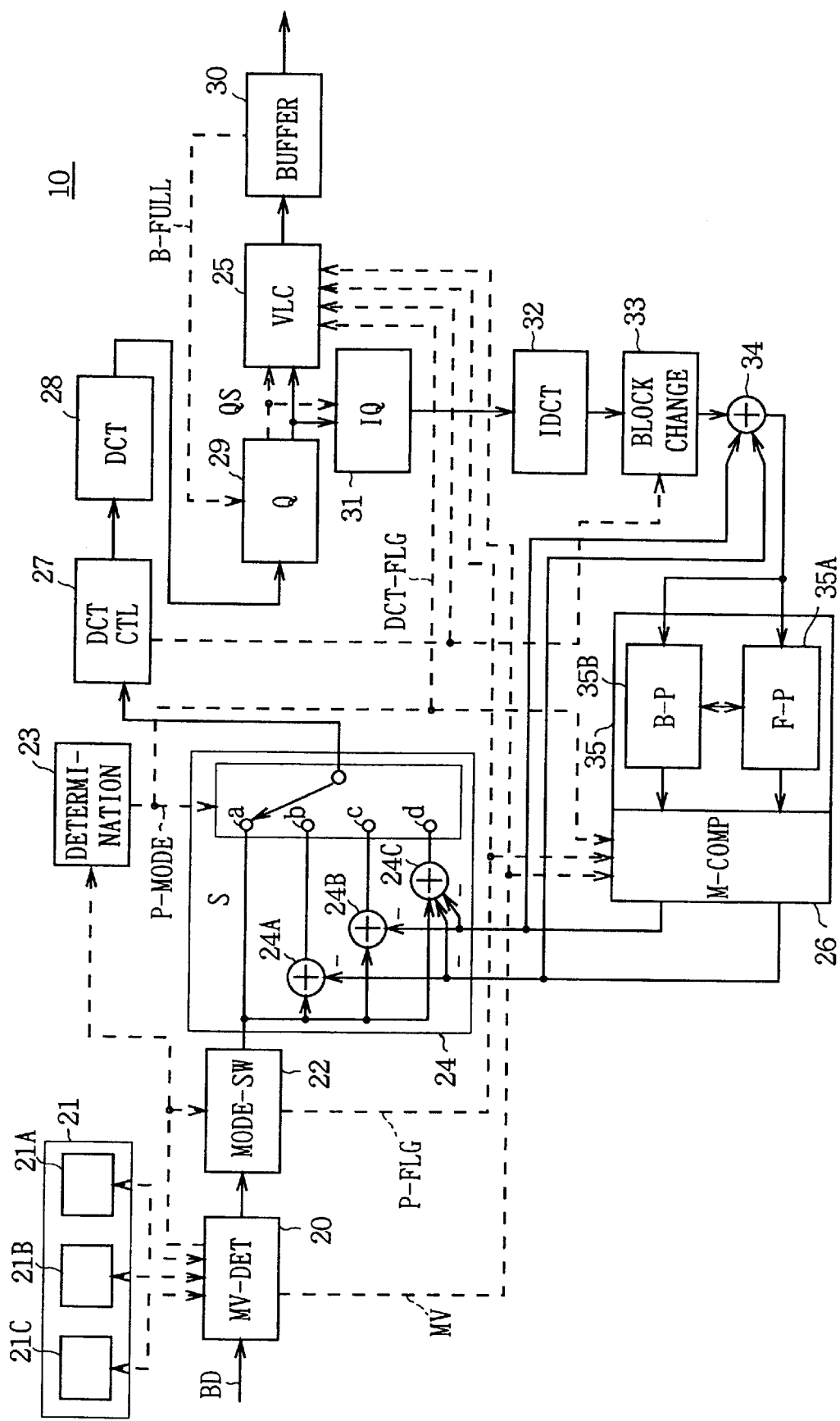
FIG. 7 is a block diagram showing the configuration of an encoder in the moving image encoding/decoding apparatus of FIG. 1.
Figures 8A, 8B, 8C:
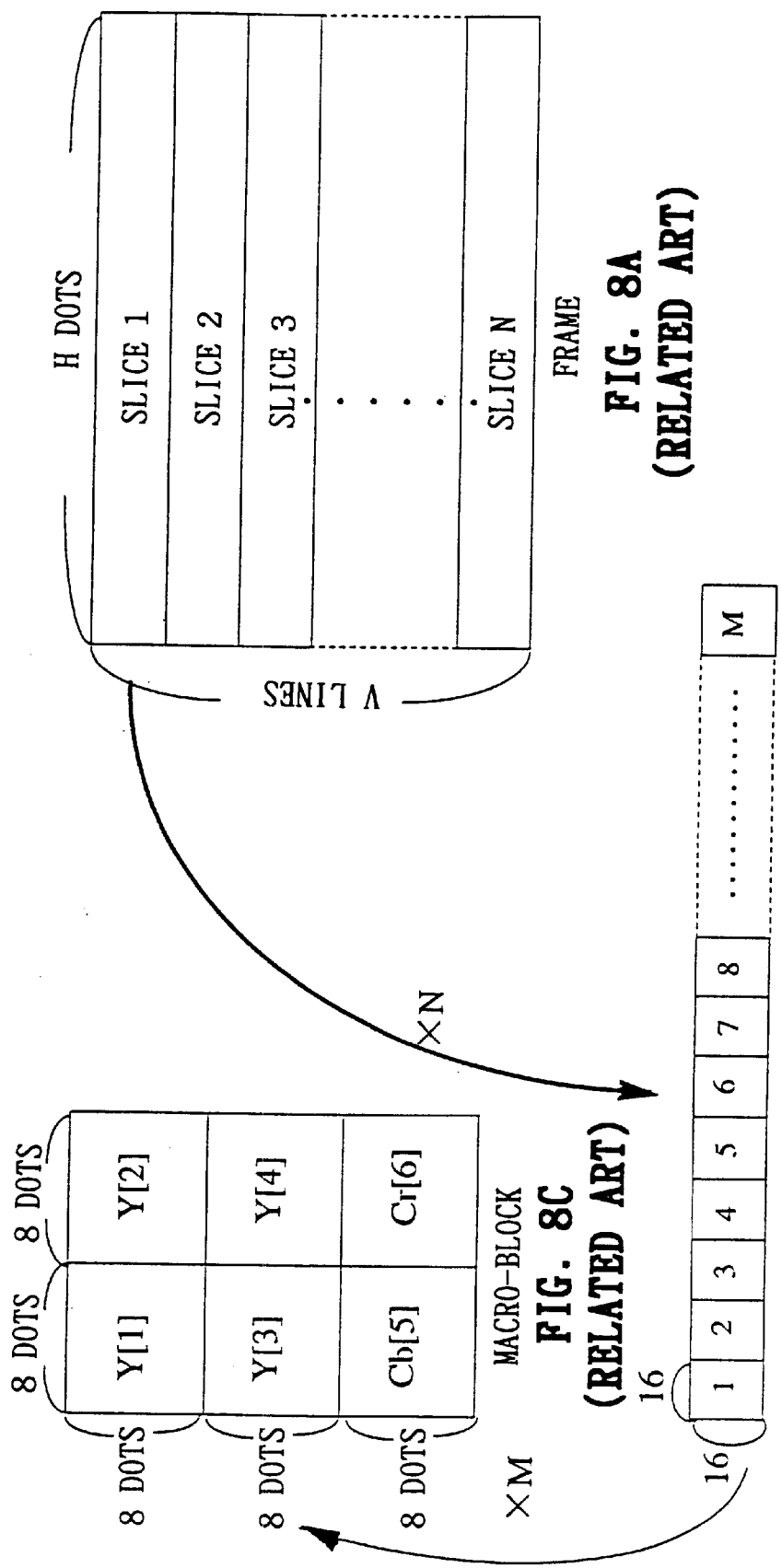
FIGS. 8A to 8C are schematic diagrams showing the structure of image date as explanation of a format convertor circuit.
Figures 9A, 9B:
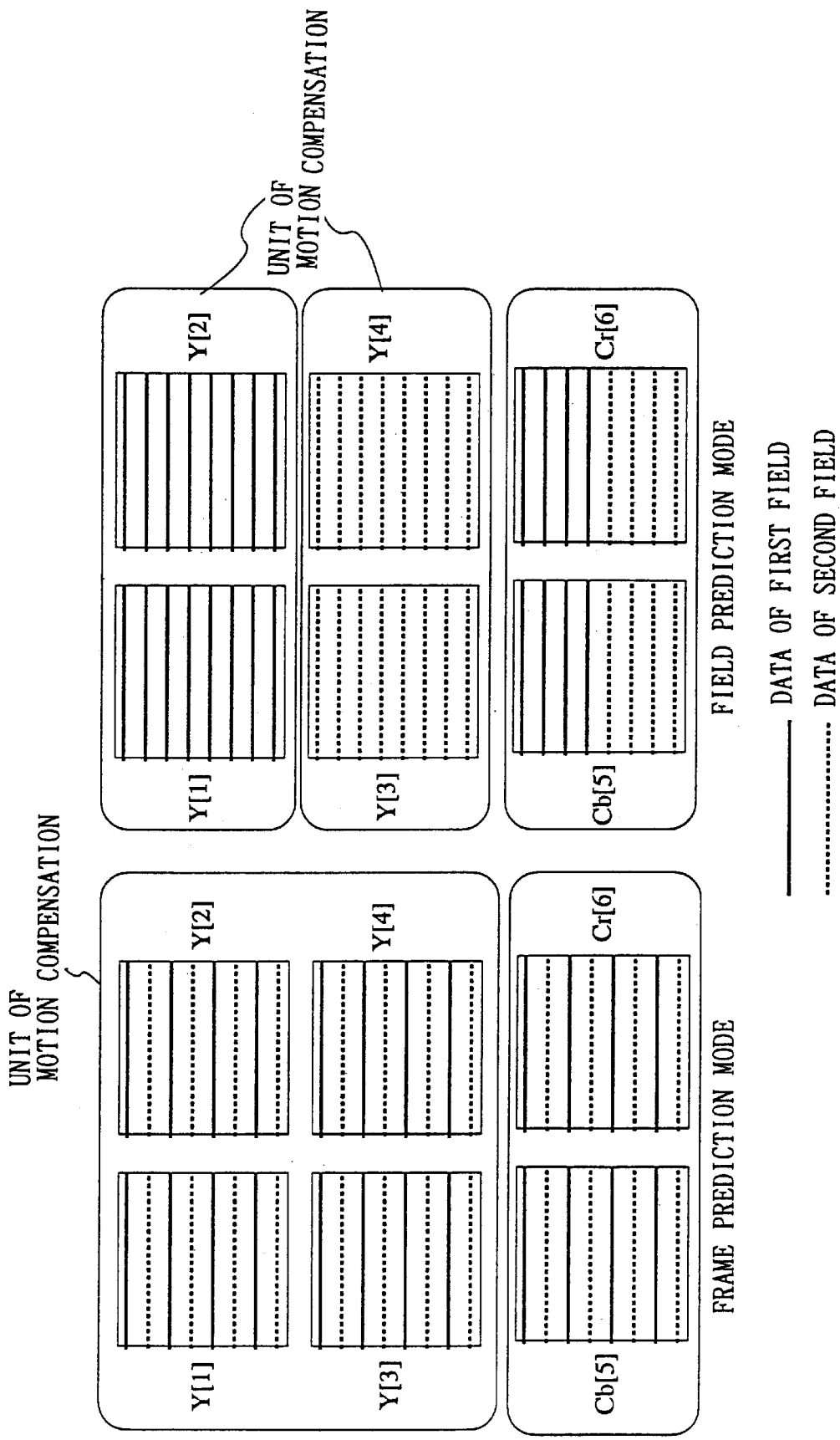
FIGS. 9A and 9B are schematic diagrams explaining the operation of a prediction mode switching circuit in the encoder.
Figures 10A, 10B:
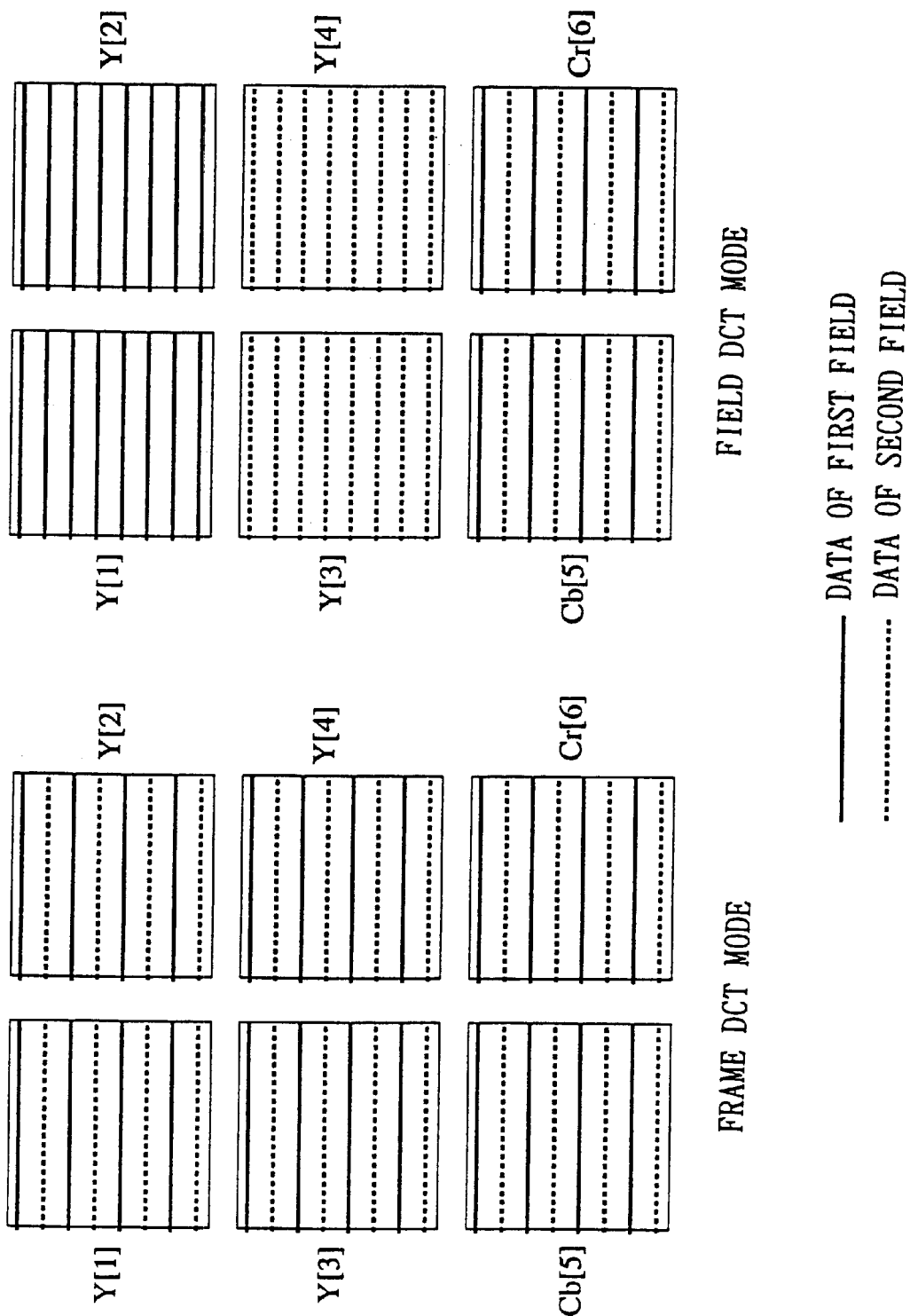
FIGS. 10A and 10B are schematic diagrams explaining the operation of a DCT mode switching circuit in the encoder.
Figure 15:
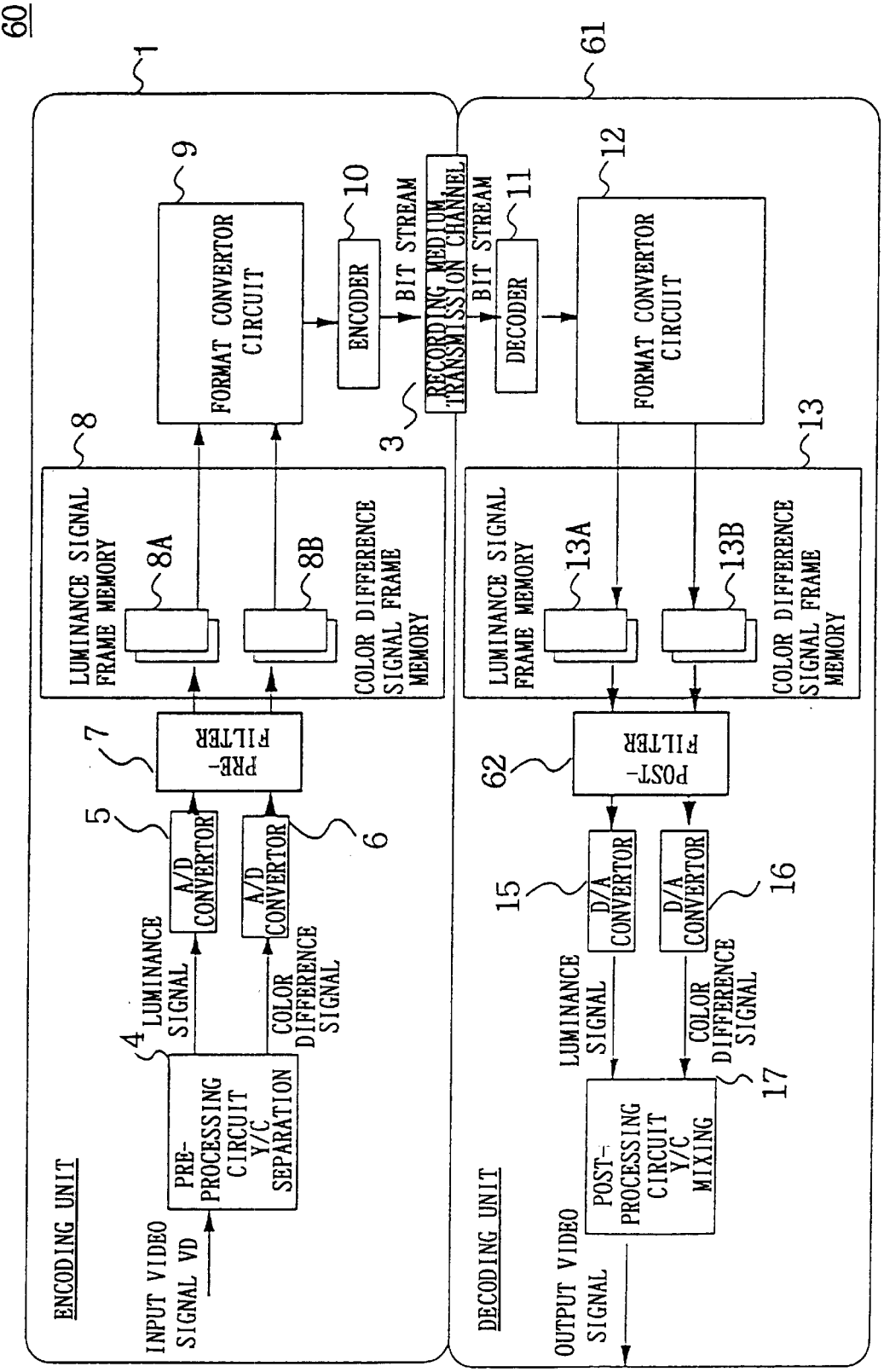
FIG. 15 is a block diagram showing the configuration of a moving image encoding/decoding apparatus according to a first embodiment of the present invention.

FIG. 15 is a block diagram showing the configuration of the moving image encoding/decoding apparatus 60 according to the first embodiment of the present invention. The corresponding elements of FIG. 15 are designated with the same reference numerals as FIG. 1.

In the first embodiment of the present invention, to make less prominent unnaturally deteriorated image portions, a post-filter 62 in a decoding unit 61 controls the amount of noise adding to decoded moving image signal in accordance with the luminance signal (level) of input image. Specifically, the post-filter 62 detects noise (deteriorations) in a digital image signal or a region of the digital image signal which is likely to include noise, and adds random noise to the region. Thereby, it can make less prominent unnaturally deteriorated image portions caused by digital compression.

Figure 16:
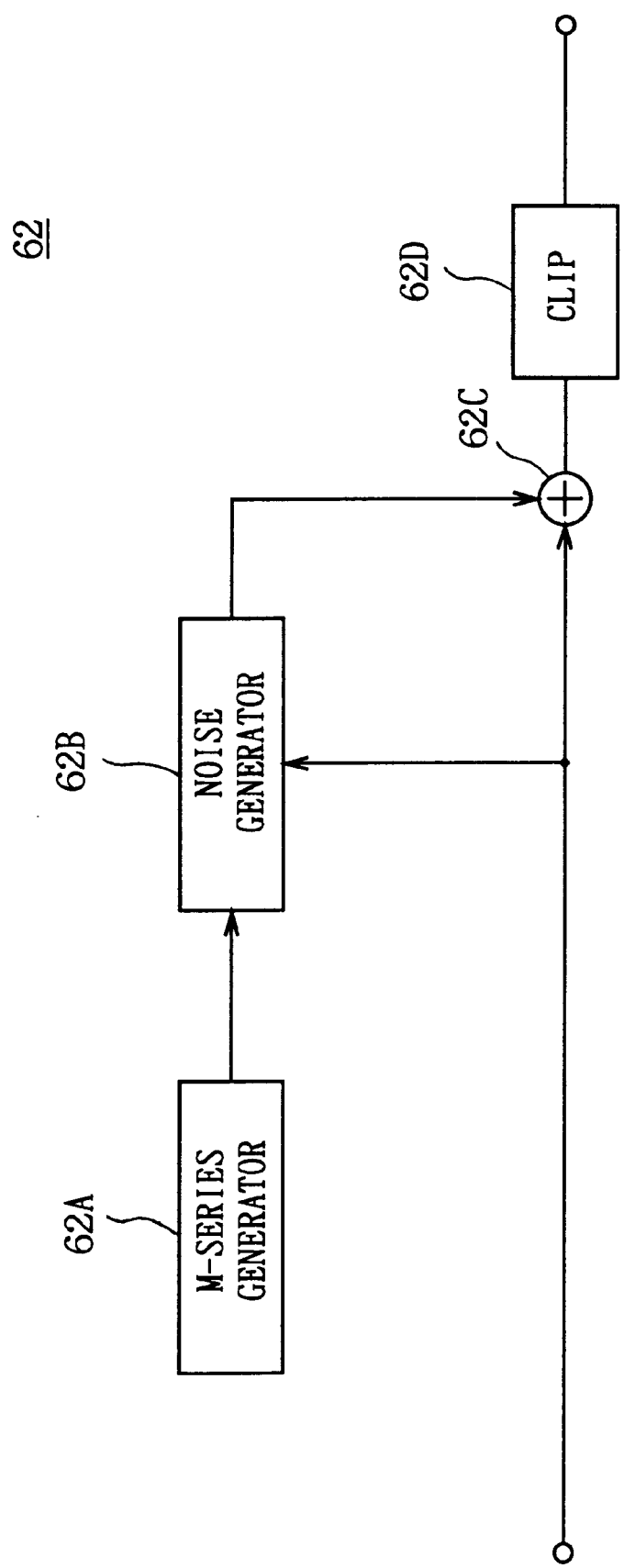
FIG. 16 is a block diagram showing the configuration of a post-filter in the first embodiment of the present invention.

FIG. 16 shows the configuration of the post-filter 62. The post-filter 62 shown in FIG. 16 is composed of a M-series generator circuit 62A, a noise generator circuit 62B, an adder 62C, and a clip circuit 62D. First, a luminance signal of a moving image signal is supplied to the noise generator circuit 62B and the adder 62C. The noise generator circuit 62B is formed of ROM (read only memory) for generating noise to be added to a luminance signal of a moving image signal in accordance with the luminance signal of the decoded and inputted moving image signal. While this additional noise may be white noise, the noise generator circuit 62B randomly generates, for example, values of "−1", "+1", "−2", "+2", and "0". A generation probability of each value varies depending on a luminance signal (level) of a decoded moving image signal as shown by following table:

TABLE 1

| LUMINANCE | −1 | +1 | −2 | +2 | 0 |
|---|---|---|---|---|---|
| 0–19 | 0–15 | 15–31 | 32–47 | 48–63 | |
| 20–29 | 0–11 | 12–23 | 24–35 | 36–47 | 48–63 |
| 30–39 | 0–9 | 10–19 | 20–29 | 30–39 | 40–63 |
| 40–49 | 0–4 | 5–9 | 10–14 | 15–19 | 20–63 |
| 50– | 0–4 | 5–9 | | | 10–63 |

The M-series generator circuit 62A generates a random number which is outputted to the noise generator circuit 62B. A bit length of this random number is determined by the accuracy of the noise generation probability in the noise generator circuit 62B. For example, the M-series generator circuit 62A may generate a random number of six bits. Thus, the noise generator circuit 62B outputs either of the values "−1", "+1", "−2", "+2", and "0" to the adder 62C in accordance with the luminance signal (level) and the 6-bit random number generated in the M-series generator circuit 62B, as shown in the Table 1.

The adder 62C adds the noise generated by the noise generator circuit 62B to a luminance signal of a decoded moving image signal, and supplies the added luminance signal to the clip circuit 62D. The clip circuit 62D rounds the supplied and added luminance signal to an 8-bit image signal and supplies the resulting 8-bit image signal to a D/A convertor 15. A color difference signal is supplied as is to a D/A convertor 16 without being subjected to any processing.

As described the above, in the first embodiment of the present invention, the encoding unit 1 encodes a moving image signal using a predetermined prediction image signal, performs predetermined processing to the encoded signal, and quantizes the signal obtained by the processing. Further, the encoding unit 1 variable length encodes the quantized signal, and outputs the resulting encoded moving image signal. Then, the decoding unit 61 decodes the encoded moving image signal, and adaptively adds noise to the decoded moving image signal in accordance with a luminance signal of the decoded moving image signal.

According to the foregoing configuration, in the present invention, since the noise is adaptively added to the luminance signal of the decoded moving image signal in accordance with the luminance signal of the decoded moving image signal, it is possible to make less prominent deteriorations, particularly pseudo-outlines, caused by the emphasis processing performed in a TV monitor, whereby a natural image can be reproduced from a digital image signal and viewed even on the TV monitor in which the emphasis processing is performed.

Figure 17:
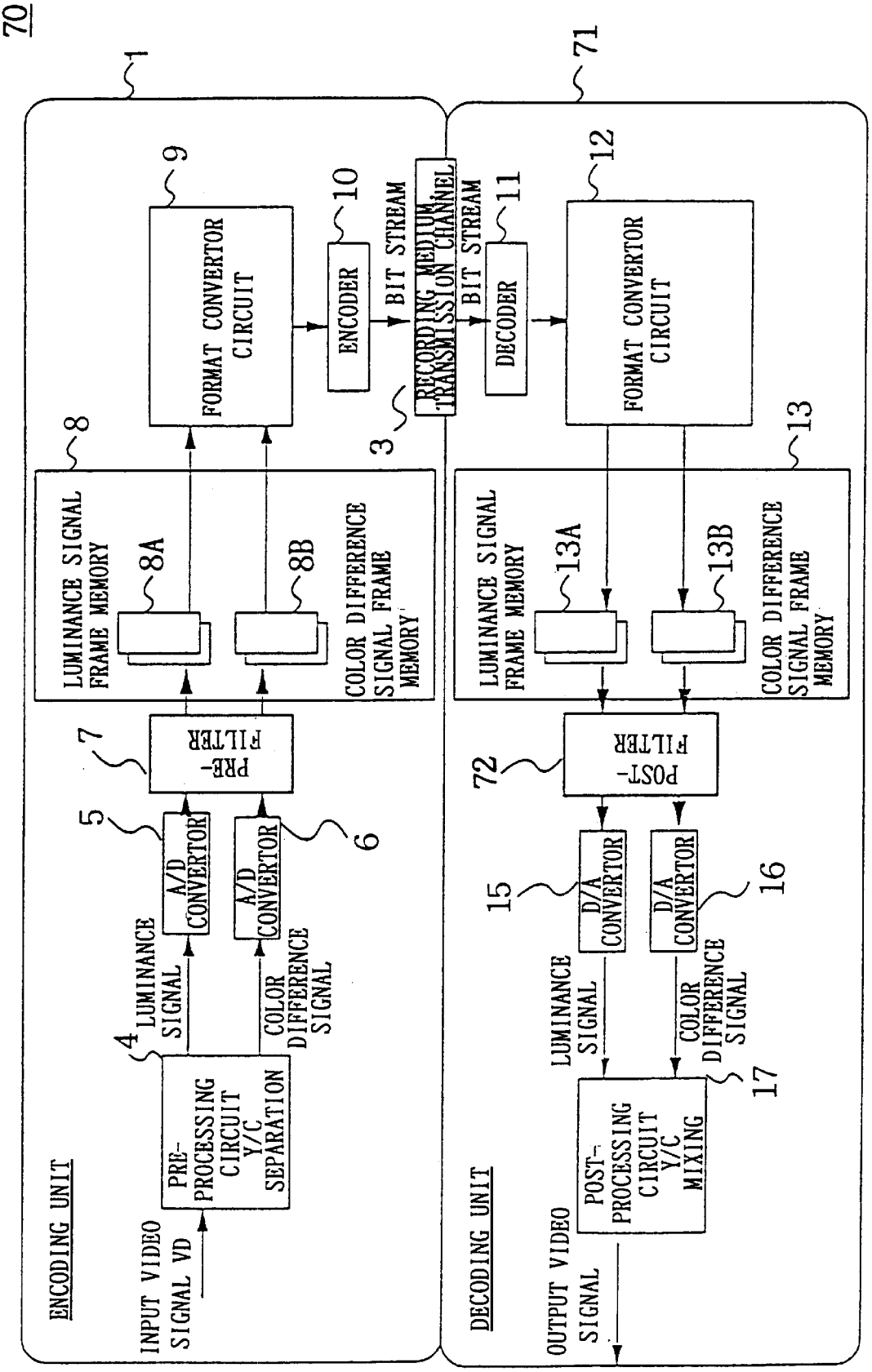
FIG. 17 is a block diagram showing the configuration of a moving image encoding/decoding apparatus according to a second embodiment of the present invention.

FIG. 17 is a block diagram showing the configuration of a moving image encoding/decoding apparatus 70 according to the second embodiment of the present invention. The corresponding elements of FIG. 17 are designated with the same reference numerals as FIG. 1.

In the second embodiment, to make less prominent unnaturally deteriorated image portions, a post-filter 72 in a decoding unit 71 detects a flatness of a decoded moving image signal (a smoothness of a luminance change) for controlling an amount of noise to be added to the decoded moving image signal, in accordance with the flatness and the luminance signal (level) of the decoded moving image signal. Thereby, it can make less prominent unnaturally deteriorations caused by digital-compression.

Figure 18:
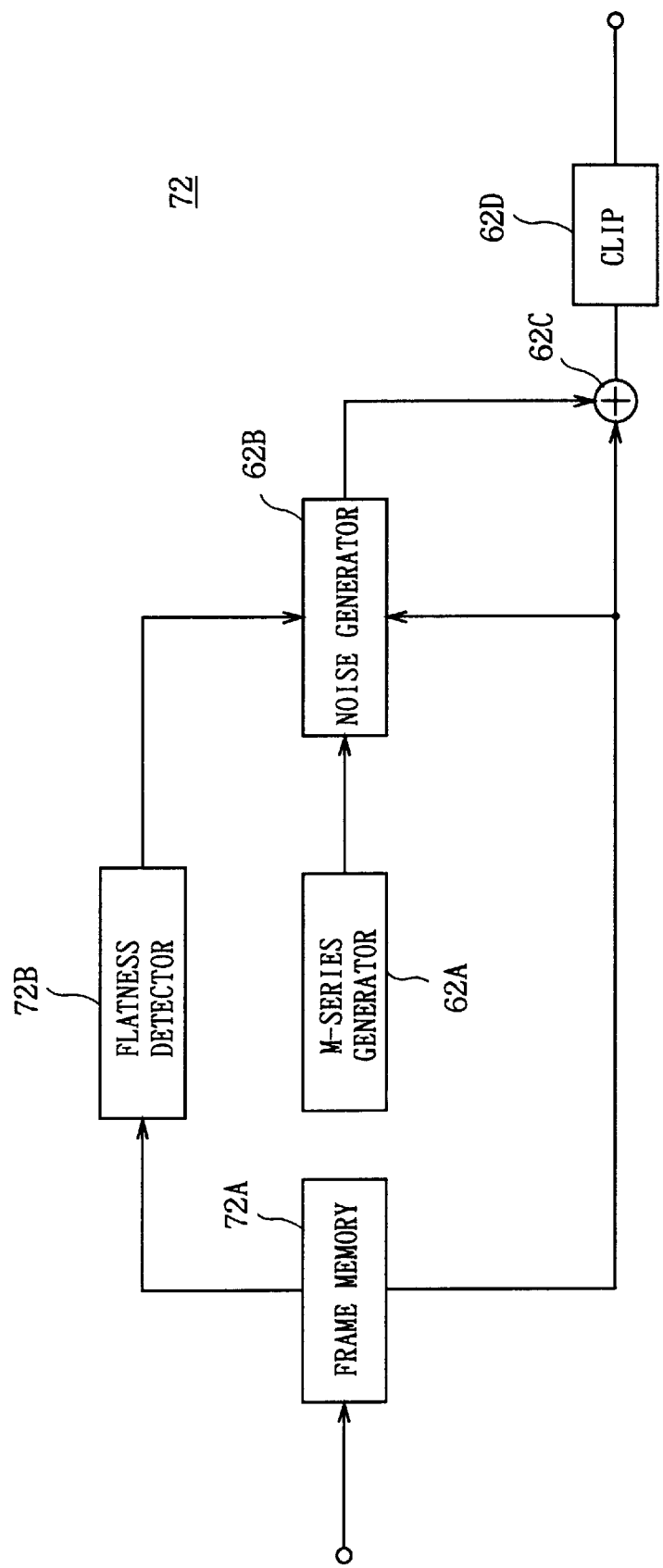
FIG. 18 is a block diagram showing the configuration of a post-filter in the second embodiment of the present invention.

FIG. 18 shows the configuration of the post-filter 72. The corresponding elements of FIG. 18 are designated with the same reference numerals as FIG. 16. As shown in FIG. 18, the post-filter 72 is composed of not only the M-series generator circuit 62A, noise generator circuit 62B, adder 62C, and clip circuit 62D but also a frame memory 72A and a flatness detector circuit 72B. Similar to the post-filter 62, the post-filter 72 also adds noise only to a luminance signal. A decoded moving image signal is first inputted to the frame memory 72A. If the decoded moving image signal is to be processed in the unit of fields, a field memory is utilized instead of a frame memory. The luminance signal of the moving image signal is supplied from the frame memory 72A to a noise generator circuit 62B, an adder 62C, and a flatness detector circuit 72B, respectively.

The flatness detector circuit 72B detects a flatness in each pixel. This detection is performed because noise (deteriorations), particularly pseudo-outline, is more prominent in a flat region in which the luminance is gradually changing. The flatness detector circuit 72B detects the flatness in each pixel by a method explained below.

FIG. 19 shows a block of 3×3 pixels around a pixel e. First, a parameter labeled "flatness" is defined for indicating the flatness. In FIG. 19, the flatness is given by the following equations (2), (3), (4), (5), and (6):

$$flt1=(|a-e|+|e-i|)/2 \tag{2}$$

$$flt2=(|b-e|+|e-h|)/2 \tag{3}$$

$$flt3=(|c-e|+|e-g|)/2 \tag{4}$$

$$flt4=(|d-e|+|e-f|)/2 \tag{5}$$

$$\text{flatness}=(flt1+flt2+flt3+flt4)/4 \tag{6}$$

The flatness is a parameter which indicates a gradient at an associated point and presents a smaller value as an image is flatter, and presents a large value near an edge.

The noise generator circuit 62B outputs either of the values "−1", "+1", "−2", "+2" and "0" to the adder 62C in accordance with the flatness for each pixel detected by the flatness detector circuit 72B and a 6-bit random number inputted thereto from the M-series generator circuit 62. The generation probability of each value varies depending on the luminance signal (level) and the flatness in each pixel, as shown in the following table:

TABLE 2

| LUMINANCE | −1 | +1 | −2 | +2 | 0 |
|---|---|---|---|---|---|
| (LOW FLATNESS) | | | | | |
| 0–19 | −15 | 15–31 | 32–47 | 48–63 | |
| 20–19 | 0–11 | 12–23 | 24–35 | 36–47 | 48–63 |
| 30–39 | 0–9 | 10–19 | 20–29 | 30–39 | 40–63 |
| 40–49 | 0–4 | 5–9 | 10–14 | 15–19 | 20–63 |
| 50– | 0–4 | 5–9 | | | 10–63 |
| (HIGH FLATNESS) | | | | | |
| 0–255 | | | | | 0–63 |

The adder 62C adds the noise generated by the noise generator circuit 62B and the luminance signal of the decoded moving image signal supplied from the frame memory 72A, and then supplies the resulting added luminance signal to a clip circuit 62D. The clip circuit 62D rounds the supplied and added luminance signal to an 8-bit image signal and outputs the resulting image signal to a D/A convertor 15. A color difference signal is supplied as is to a D/A convertor 16 without being subjected to any processing.

As described above, in the second embodiment of the present invention, the encoding unit 1 encodes a moving image signal using a predetermined prediction image signal, performs predetermined processing to the encoded signal, and quantizes the signal obtained by the processing. Further, the encoding unit 1 variable length encodes the quantized signal and outputs the encoded moving image signal. Then, the decoding unit 61 decodes the encoded moving image signal, and adaptively adds noise to thus decoded moving image signal in accordance with the luminance signal of the decoded moving image signal and a flatness.

According to the foregoing configuration, in the present invention, since the flatness for the decoded moving image signal is calculated such that the noise is adaptively added to the luminance signal of the decoded moving image signal in accordance with the flatness and the luminance signal of the decoded moving image signal, it is possible to make less prominent deteriorations, particularly pseudo-outlines, caused by the emphasis processing performed in a TV monitor, whereby a natural image can be reproduced from a digital image signal and viewed even on the TV monitor in which the emphasis processing is performed.

Figure 20:
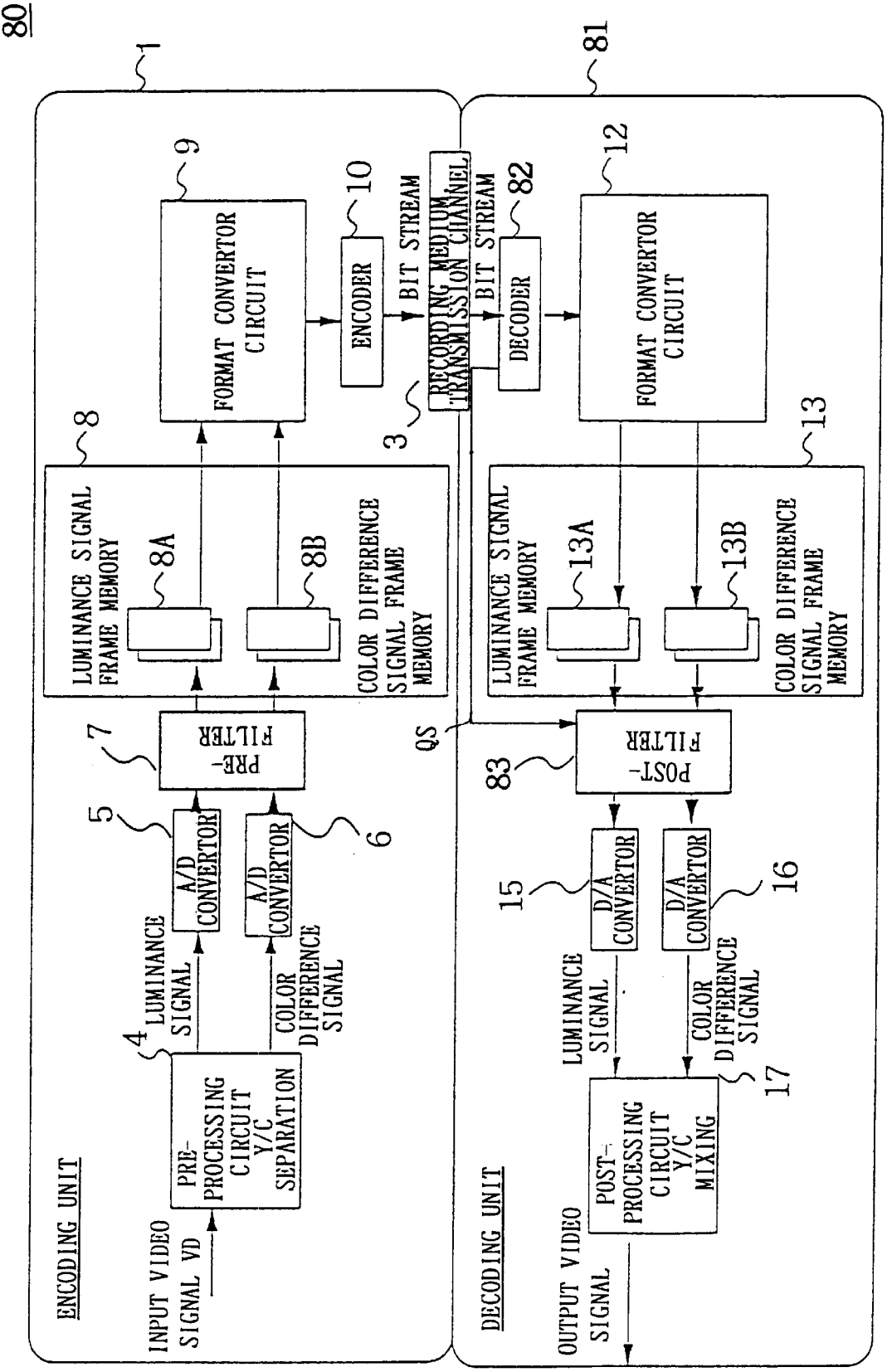
FIG. 20 is a block diagram showing the configuration of a moving image encoding/decoding apparatus according to a third embodiment of the present invention.

FIG. 20 is a block diagram showing the configuration of a moving image encoding/decoding apparatus 80 according to the third embodiment of the present invention. The corresponding elements of FIG. 20 are designated with the same reference numerals as FIG. 1.

In the third embodiment of the present invention, to make less prominent unnaturally deteriorated image portions, a post-filter 83 in a decoding unit 81 controls an amount of noise to be added to a luminance signal of a decoded moving image in accordance with the quantization scale (QS). A decoder 82 in the decoding unit 81 outputs a quantization scale (QS) to a post-filter 83 when decoding a bit stream.

The quantization scale (QS) is an important parameter for determining the image quality in encoding a moving image signal. Specifically, as the quantization scale (QS) is smaller, less deteriorations are present, and deteriorations are prominent when the quantization scale (QS) is large. Thus, the decoding unit 81 increases an amount of noise to be added in a region where the quantization scale is larger to make the deteriorations less prominent. Thereby, it is possible make less prominent unnaturally deteriorations caused by digital-compression.

Figure 11:
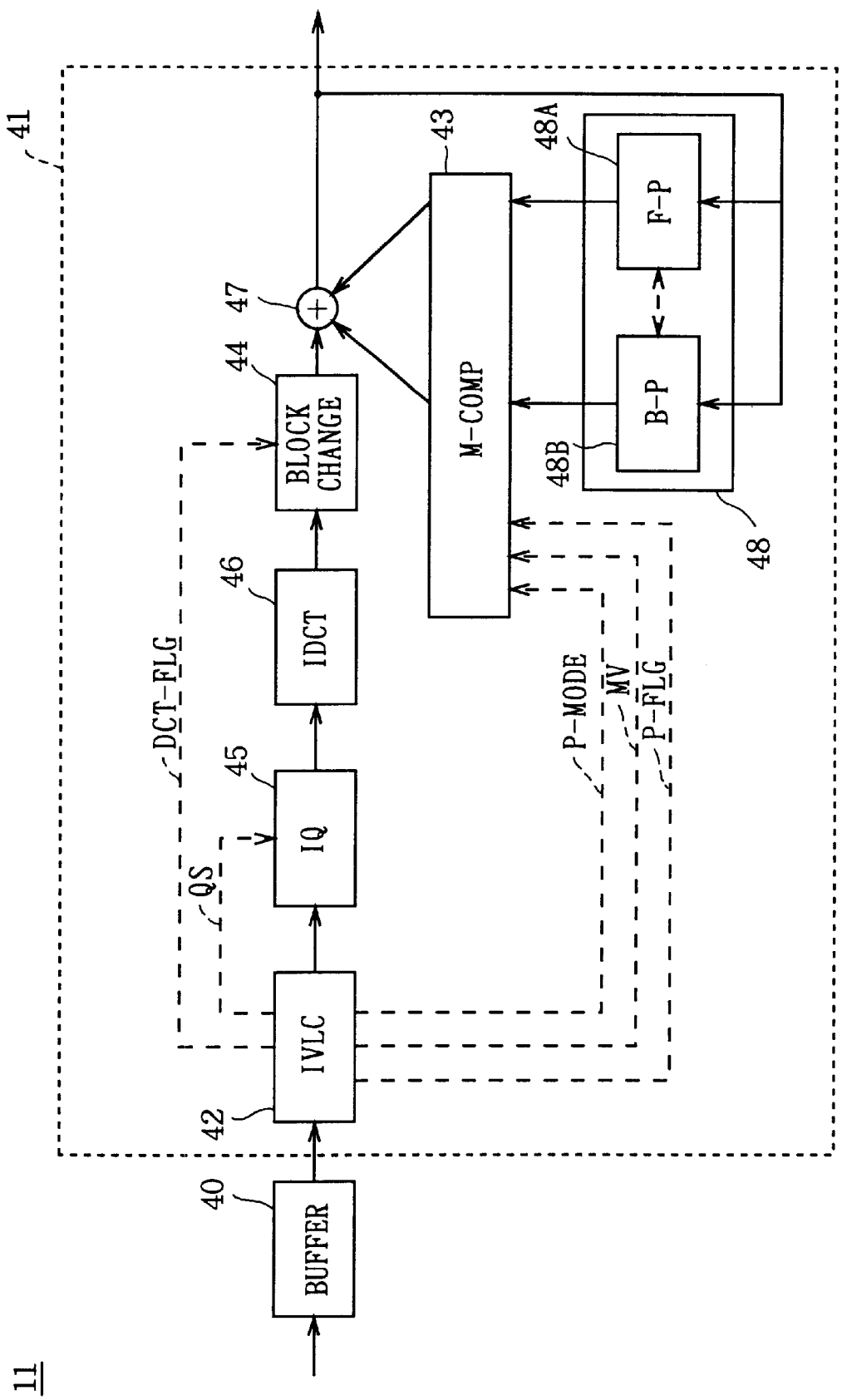
FIG. 11 is a block diagram showing the configuration of a decoder in the moving image encoding/decoding apparatus of FIG. 1.
Figure 12:
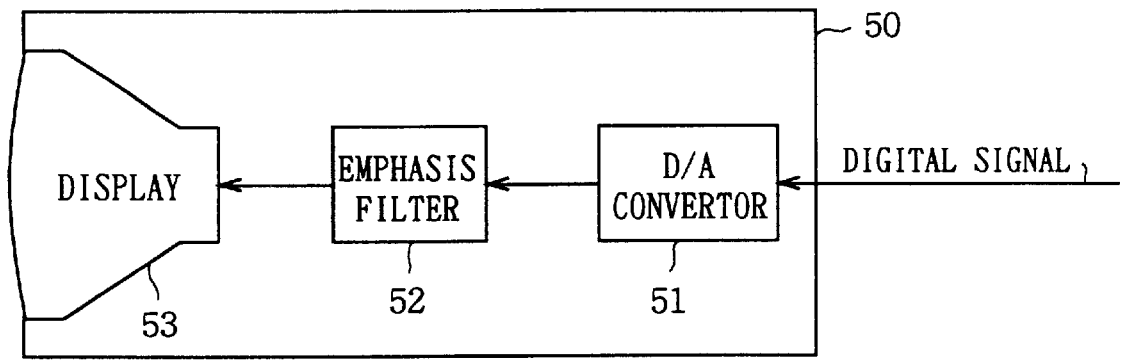
FIG. 12 is a block diagram explaining the emphasis processing in a TV monitor.
Figure 13:
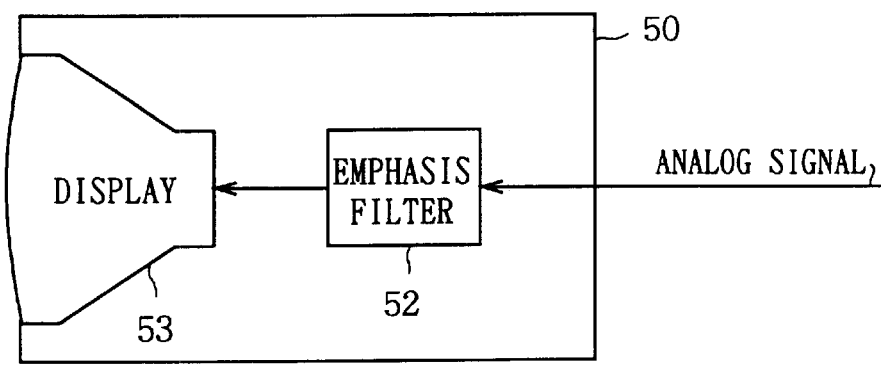
FIG. 13 is a block diagram explaining the emphasis processing in a TV monitor.
Figure 14A:
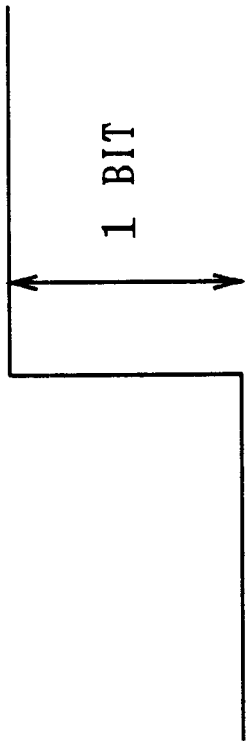
FIGS. 14A and 14B are schematic diagrams explaining a problem caused by the emphasis processing.
Figure 14B:
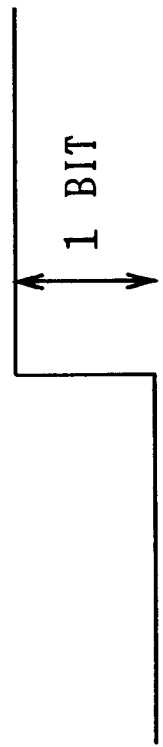
Figure 21:
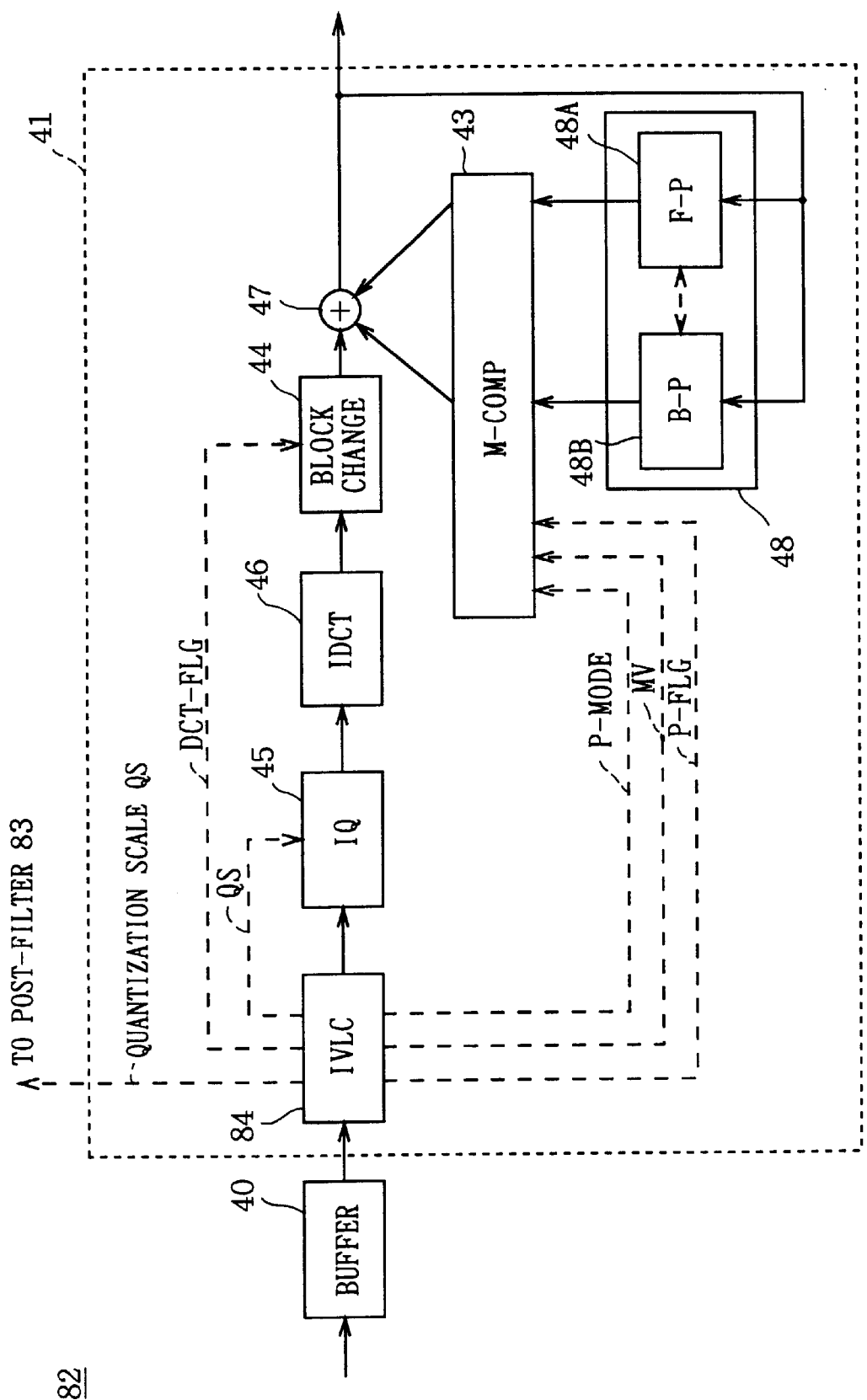
FIG. 21 is a block diagram showing the configuration of a decoder in the third embodiment of the present invention.

FIG. 21 shows the configuration of a decoder 82 in the decoding unit 81 of the third embodiment according to the present invention. The corresponding elements of FIG. 21 are designated with the same reference numerals as FIG. 11. In the decoder 82, a variable length decoding circuit 84 decodes variable length codes in a bit stream, and outputs a quantization scale (QS) for each macro block to a memory 83A in a post-filter 83. Then, the memory 83A stores this quantization scale (QS) for each macro block therein.

Figure 22:
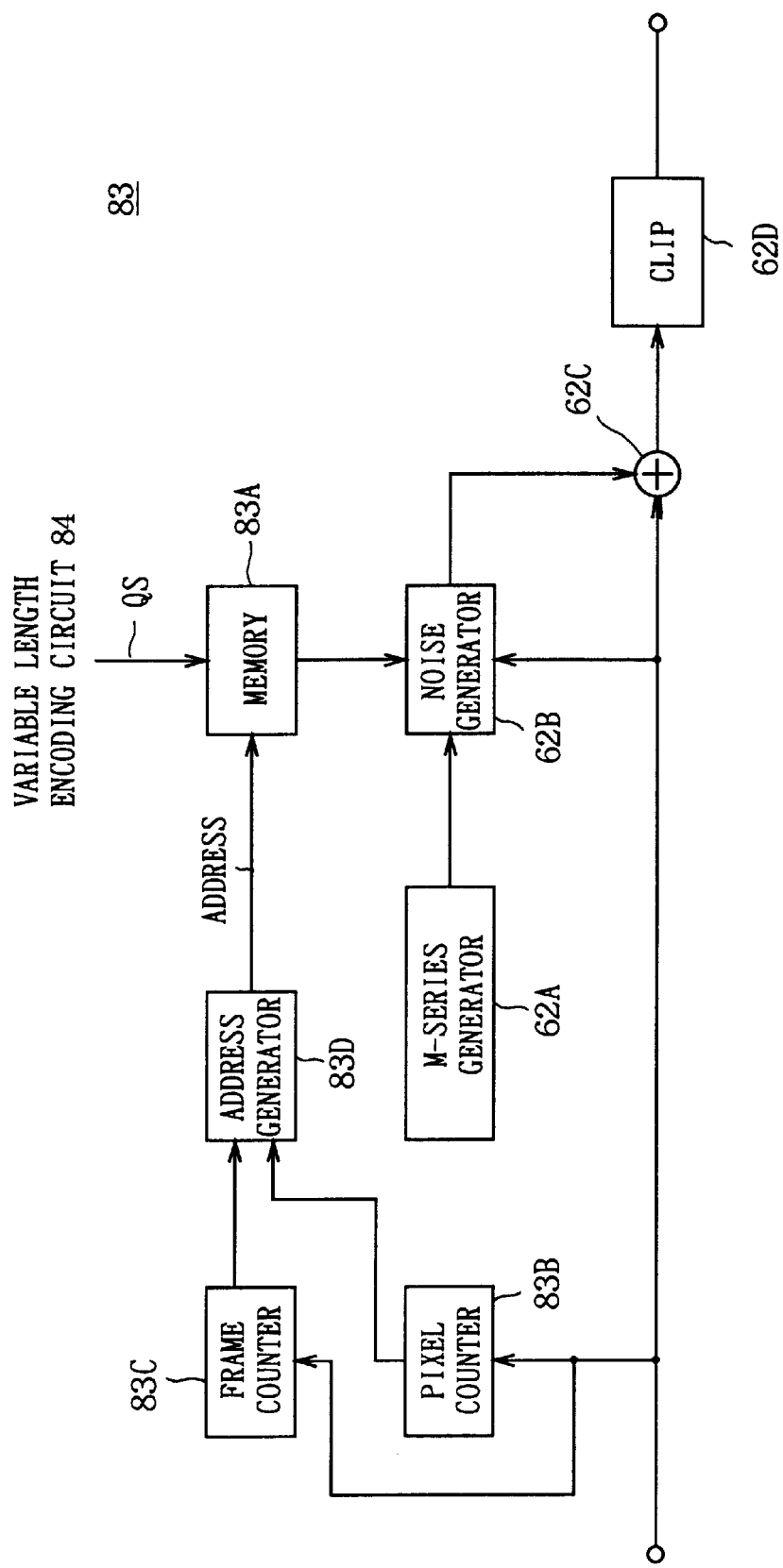
FIG. 22 is a block diagram showing the configuration of a post-filter in the third embodiment of the present invention.

FIG. 22 shows the configuration of the post-filter 83. The corresponding elements of FIG. 22 are designated with the same reference numerals as FIG. 16. As shown in FIG. 22, the post-filter 83 is composed of not only the M-series generator circuit 62A, noise generator circuit 62B, adder 62C, and clip 62D but also a memory 83A, a pixel counter 83B, a frame counter 83C, and an address generator circuit 83D. A decoded moving image signal is inputted to the pixel counter 83B, frame counter 83C, noise generator circuit 62B, and adder 62C, respectively. The pixel counter 83B counts the number of pixels, while the frame counter 83C counts the number of frames. The number of pixels and the number of frames, thus counted, are outputted to the address generator circuit 83D. The pixel counter 83B is reset every time one frame is completed.

The address generator circuit 83D calculates a frame number and a pixel location from the obtained number of the frames and number of pixels, and generates an address of a corresponding macro block from thus resulting frame number and pixel location. Then, the address generator circuit 83D generates the resulting address for the memory 83A to read out the quantization scale (QS) of the macro block which corresponds to thus obtained address from the memory 83A. The read quantization scale (QS) is supplied to the noise generator circuit 62B. The noise generator circuit 62B controls an amount of noise to be added to the decoded moving image signal in accordance with the supplied quantization scale (QS).

Specifically, the noise generator circuit 62B is supplied with a 6-bit random number generated in an M-series generator circuit 62A. Thus, the noise generator circuit 62B, upon receiving the quantization scale (QS) and the 6-bit random number, outputs either of the values "−1", "+1", "−2", "2", and "0" to the adder 62C in accordance with the quantization scale (QS) and the 6-bit random number, as shown in the following table:

TABLE 3

| Q | −1 | +1 | −2 | +2 | 0 |
|---|---|---|---|---|---|
| 50− | 0–15 | 15–31 | 32–47 | 48–63 | |
| 49–40 | 0–11 | 12–23 | 24–35 | 36–47 | 48–63 |
| 39–30 | 0–9 | 10–19 | 20–29 | 30–39 | 40–63 |
| 29–20 | 0–4 | 5–9 | 10–14 | 15–19 | 20–63 |
| −19 | 0–4 | 5–9 | | | 10–63 |

The adder 62C adds noise generated by the noise generator circuit 62B and a luminance signal inputted from the frame memory 72A, and then supplies thus added input luminance signal to a clip circuit 62D. The clip circuit 62D rounds the added and supplied input luminance signal to an 8-bit image signal and supplies the resulting image signal to a D/A convertor 15. A color difference signal is supplied as is to a D/A convertor 16 without subjected to any processing.

As described above, in the third embodiment of the present invention, the encoding unit 1 encodes a moving image signal using a predetermined prediction image signal, performs predetermined processing to the encoded signal, and quantizes the signal resulting from the processing. Further, the encoding unit 1 variable length encodes the quantized signal and outputs the encoded signal. Then, the decoding unit 61 decodes thus encoded moving image signal, and adaptively adds noise to the decoded moving image signal in accordance with the quantization scale (QS) used when the moving image signal was decoded.

According to the foregoing configuration, in the present invention, since the noise is adaptively added to the luminance signal of the decoded moving image signal in accordance with the quantization scale (QS) inputted from the decoder 82, it is possible to make less prominent deteriorations, particularly pseudo-outlines, caused by the emphasis processing performed in a TV monitor, whereby a natural image can be reproduced from a digital image signal and viewed even on the TV monitor in which the emphasis processing is performed.

While the above first, second, and third embodiments have been described for the case where a digital image signal is encoded in accordance with the MPEG scheme, the present invention is not limited to this particular scheme, but may be used with any other image signal encoding scheme for encoding digital image signals.

Also, while the above first, second, and third embodiments have been described for the case where noise is added to a luminance signal of a decoded moving image signal, the present invention is not limited to such particular embodiments. Alternatively, the noise may also be added to a color difference signal. In this case, the noise generator circuit generates and supplies noise using a luminance signal associated with each color difference signal to an adder. Thereafter, the adder adds the noise to a color difference signal of the decoded moving image signal.

Also, while in the above second embodiment, the flatness representing the smoothness of a luminance change is detected using Equations (2), (3), (4), (5), and (6), the present invention is not limited to this particular detection method, but the flatness may be detected by any other method known in the art flatness detecting method).

Additionally, in the above second embodiment, the case where noise which is added to a luminance signal of a decoded moving image signal in accordance with the luminance signal of the decoded moving image signal and the flatness is controlled has been described. The present invention, however, is not limited to this, and the noise which is added to a luminance signal of the decoded moving image signal only in accordance with the flatness of the decoded moving image signal may be controlled. In this case, as shown in FIG. 18, a luminance signal of the decoded moving image signal is not supplied from the frame memory to the noise generator circuit.

Further, in the above third embodiment, noise which is added to a luminance signal of a decoded moving image signal in accordance with a quantization scale used when the moving image signal was encoded is controlled. The present invention is not limited to this, and the noise which is added in accordance with the luminance signal of the decoded moving image signal and the quantization scale may be controlled. In this case, as shown in FIG. 22, a luminance signal of the decoded moving image signal is supplied to the noise generator circuit 62B. Accordingly, by performing this processing, the present invention enables deteriorations, particularly pseudo-outlines, caused by the emphasis processing to be far less prominent.

Figure 23:
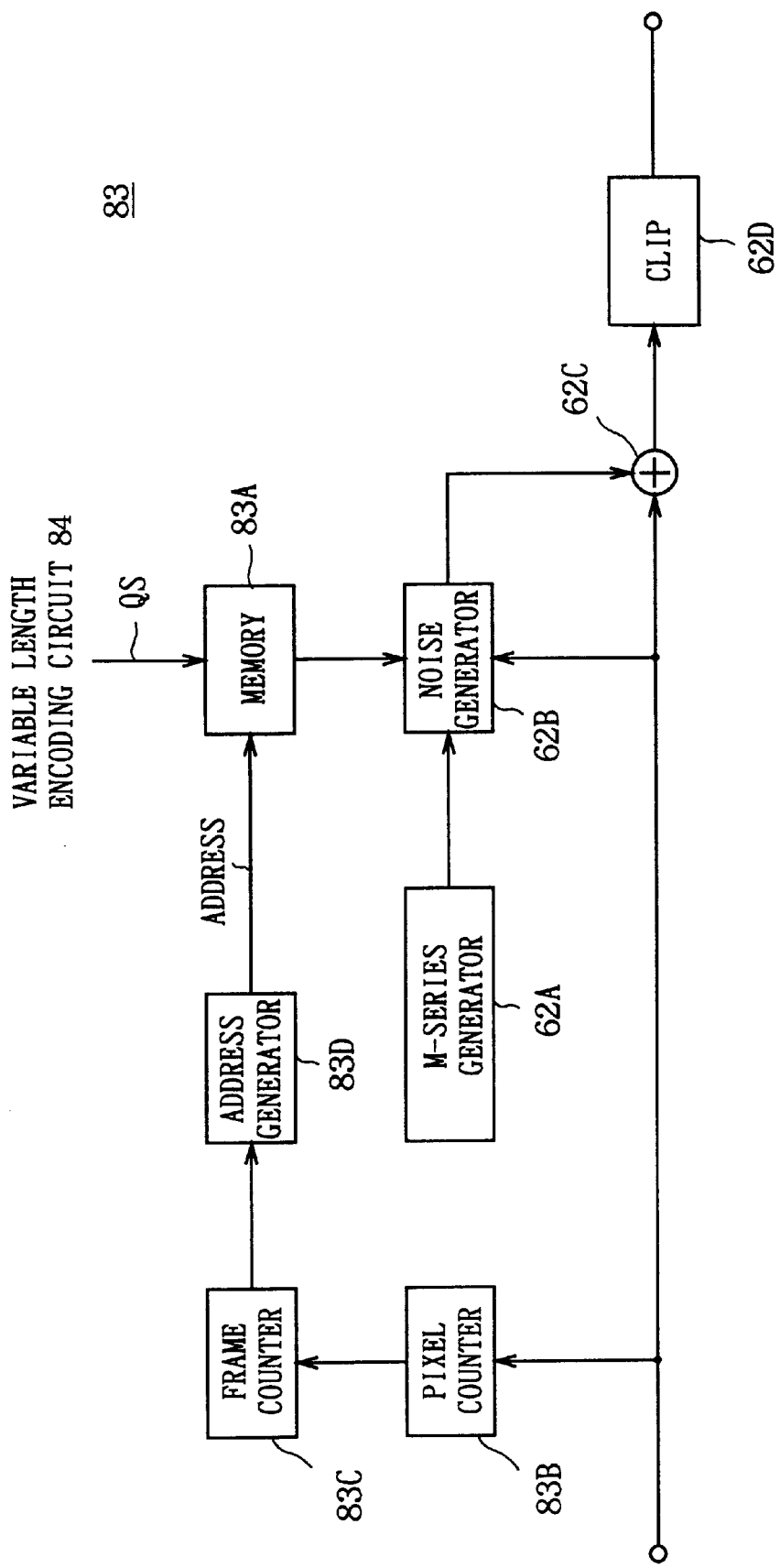
FIG. 23 is a block diagram showing the configuration of an improved post-filter in the third embodiment of the present invention.

Further, in the above third embodiment, the case where a decoded moving image signal is supplied to the pixel counter 83B and the frame counter 83C respectively, thereafter the output signal of the pixel counter 83B and the frame counter 83C are supplied respectively to the address generator circuit 83D has been described. The present invention, however, is not only limited to this, but as shown in FIG. 23 (a fourth embodiment), a decoded moving image signal may be supplied to the pixel counter 83B, and the output signal of the pixel counter 83B may be supplied to the frame counter 83C. In this case, both signals of the number of frame and the number of pixel, of which the output signal of the frame counter 83C, are supplied to the address generator circuit 83D.

Further, in the above first, second, and third embodiments, noise is added to a luminance signal of a decoded moving image signal in accordance with the luminance signal of the decoded moving image signal. The present invention is not limited to this, and the noise may be added to the decoded moving image signal in accordance with a level of color. For example, noise is added to red or blue regions. If the noise is added to the decoded moving image signal in accordance with the luminance signal and the level of color, it is possible to make far less prominent deteriorations, particularly pseudo-outline, caused by the emphasis processing.

Further, in the above first, second, and third embodiments, it has been described a moving image encoding/decoding apparatus in detail. The above described moving image decoding apparatus may be mounted in a television.

According to the present invention as described above, a moving image signal which was encoded in an encoding unit is decoded in a decoding unit, and thus decoded moving image signal is adaptively added to noise, thereby it is possible to make less prominent unnatural deteriorations caused by digital compression even on the TV monitor in which the emphasis processing is performed.

While various embodiments have been described in connection with the preferred embodiments of the invention, it will be obvious to those skilled in the art that various changes and modifications may be aimed, therefore, to cover in the appended claims all such changes and modifications as falling within the true spirit and scope of the invention.

What is claimed is:

1. A method for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said method comprising the steps of:

receiving and decoding said encoded compressed signal to obtain a decoded uncompressed signal having at least a luminance signal component;

generating a random number;

generating a noise signal as a function of said luminance signal component and said random number;

adaptively combining said noise signal and said decoded uncompressed signal such that the undesirable effects of said emphasis processing operation are reduced;

detecting a level of the combined decoded uncompressed signal and noise signal; and adjusting said level in accordance with a predetermined signal level.

2. The method according to claim 1, wherein said encoded compressed signal is selectively obtained by intra-image encoding or predictive encoding operations, said respective intra-image encoded or predictively encoded signal being converted to a frequency domain, quantized and variable length encoded.

3. The method according to claim 1, further comprising detecting a level of said added decoded uncompressed signal and noise signal and adjusting said level in accordance with a predetermined signal level.

4. The method according to claim 1, further comprising detecting a flatness value of said decoded uncompressed signal representing how smoothly said luminance signal component changes, and wherein said noise signal is generated as a function of said flatness value and luminance signal component.

5. The method according to claim 1, further comprising receiving a quantization scale used during the encoding operation of said moving image, and wherein said noise signal is generated as a function of said quantization scale and luminance signal component.

6. The method according to claim 1, wherein said decoded uncompressed signal has a color difference signal component, and wherein said noise signal is generated as a function of said color difference and luminance signal components.

7. A method for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said method comprising the steps of:

receiving and decoding said encoded compressed signal to obtain a decoded uncompressed signal having at least a luminance signal component;

detecting a flatness value of said decoded uncompressed signal representing how smoothly said luminance signal component changes;

generating a random number;

generating a noise signal as a function of said flatness value and said random number;

adaptively combining said noise signal and said decoded uncompressed signal such that the undesirable effects of said emphasis processing operation are reduced;

detecting a level of the combined decoded uncompressed signal and noise signal; and adjusting said level in accordance with a predetermined signal level.

8. The method according to claim 7, wherein said encoded compressed signal is selectively obtained by intra-image encoding or predictive encoding operations, said respective intra-image encoded or predictively encoded signal being converted to a frequency domain, quantized and variable length encoded.

9. The method according to claim 7, further comprising generating a random number, and wherein said noise signal is generated as a function of said random number, flatness value and luminance signal component.

10. A method for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said method comprising the steps of:

receiving and decoding said encoded compressed signal to obtain a decoded uncompressed signal having at least a luminance signal component;

receiving a quantization scale used during the encoding operation of said moving image;

generating a random number;

generating a noise signal as a function of said quantization scale and said random number;

adaptively combining said noise signal and said decoded uncompressed signal such that the undesirable effects of said emphasis processing operation are reduced;

detecting a level of the combined decoded uncompressed signal and noise signal; and adjusting said level in accordance with a predetermined signal level.

11. The method according to claim 10, wherein said encoded compressed signal is selectively obtained by intra-image encoding or predictive encoding operations, said respective intra-image encoded or predictively encoded signal being converted to a frequency domain, quantized and variable length encoded.

12. The method according to claim 10, further comprising generating a random number, and wherein said noise signal is generated as a function of said random number, quantization scale and luminance signal component.

13. Apparatus for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said apparatus comprising:

means for receiving and decoding said encoded compressed signal to obtain a decoded uncompressed signal having at least a luminance signal component;

means for generating a random number;

means for generating a noise signal as a function of said random number and luminance signal component;

means for adaptively combining said noise signal and said decoded uncompressed signal such that the undesirable effects of said emphasis processing operation are reduced;

means for detecting a level of the combined decoded uncompressed signal and noise signal; and means for adjusting said level in accordance with a predetermined signal level.

14. The apparatus according to claim 13, wherein said encoded compressed signal is selectively obtained by intra-image encoding or predictive encoding operations, said respective intra-image encoded or predictively encoded signal being converted to a frequency domain, quantized and variable length encoded.

15. The apparatus according to claim 13, wherein said noise signal generating means includes memory means, wherein an input signal supplied to said memory means includes an address signal comprising said random number and luminance signal component, and wherein an output signal provided from said memory means includes said noise signal.

16. The apparatus according to claim 13, further comprising means for detecting a flatness value of said decoded uncompressed signal representing how smoothly said luminance signal component changes, and said means for generating is operative to generate said noise signal as a function of said flatness value and luminance signal component.

17. The apparatus according to claim 13, further comprising means for receiving a quantization scale used during the encoding operation of said moving image, and said means for generating is operative to generate said noise signal as a function of said quantization scale and luminance signal component.

18. The apparatus according to claim 13, wherein said decoded uncompressed signal has a color difference signal component, and said means for generating is operative to generate said noise signal as a function of said color difference and luminance signal components.

19. Apparatus for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said apparatus comprising:

means for receiving and decoding said encoded compressed signal to obtain a decoded uncompressed signal having at least a luminance signal component;

means for detecting a flatness value of said decoded uncompressed signal representing how smoothly said luminance signal component changes;

means for generating a random number;

means for generating a noise signal as a function of said random number and flatness value; means for adaptively combining said noise signal and said decoded uncompressed signal such that the undesirable effects of said emphasis processing operation are reduced;

means for detecting a level of the combined decoded uncompressed signal and noise signal; and means for adjusting said level in accordance with a predetermined signal level.

20. The apparatus according to claim 19, wherein said noise signal is generated as a function of said random number, flatness value and luminance signal component.

21. The apparatus according to claim 19, further comprising means for detecting a level of said added decoded uncompressed signal and noise signal, and means for adjusting said level in accordance with a predetermined signal level.

22. The apparatus according to claim 18, wherein said noise signal generating means includes memory means, wherein an input signal supplied to said memory means includes an address signal comprising said random number and flatness value, and wherein an output signal provided from said memory means includes said noise signal.

23. Apparatus for reducing undesirable effects of a filtering operation occurring after a decoding operation of a moving image represented by an encoded compressed signal, said filtering operation including an emphasis processing operation which causes improvement of some aspects of said moving image and also causes deterioration of other aspects of said moving image by unintentionally emphasizing signal encoding and compressing operations, said apparatus comprising:

means for receiving and decoding said encoded compressed signal to obtain a decoded uncompressed signal having at least a luminance signal component;

means for receiving a quantization scale used during the encoding operation of said moving image;

means for generating a random number;

means for generating a noise signal as a function of said random number and quantization scale; and means for adaptively combining said noise signal and said decoded uncompressed signal such that the undesirable effects of said emphasis processing operation are reduced;

means for detecting a level of the combined decoded uncompressed signal and noise signal; and means for adjusting said level in accordance with a predetermined signal level.

24. The apparatus according to claim 23, wherein said encoded compressed signal is selectively obtained by intra-image encoding or predictive encoding operations, said respective intra-image encoded or predictively encoded signal being converted to a frequency domain, quantized and variable length encoded.

25. The apparatus according to claim 23, wherein said noise signal is generated as a function of said random number, quantization scale and luminance signal component.

26. The apparatus according to claim 23, further comprising means for detecting a level of said added decoded uncompressed signal and noise signal, and means for adjusting said level in accordance with a predetermined signal level.

27. The apparatus according to claim 23, wherein said means for generating includes:

memory means for storing said quantization scale;

means for counting pixels and frames in said decoded uncompressed signal; and means for generating an address signal supplied to said memory means as a function of the number of pixels and frames such that said noise signal corresponding to said supplied address signal is generated as an output signal from said memory means.

28. A television receiver for decoding an encoded compressed signal representing a moving image and for displaying said moving image, said television receiver comprising:

means for receiving and decoding said encoded compressed signal to obtain a decoded uncompressed signal having at least a luminance signal component;

means for generating a random number;

means for generating a noise signal as a function of said random number and luminance signal component;

means for adaptively combining said noise signal and said decoded uncompressed signal;

means for detecting a level of the combined decoded uncompressed signal and noise signal;

means for adjusting said level in accordance with a predetermined signal level;

means for emphasis processing said combined decoded uncompressed signal and noise signal to obtain an output signal, said emphasis processing means causing improvement of some aspects of said moving image and also causing deterioration of other aspects of said moving image by unintentionally emphasizing signal encoding and compressing operations; and means for displaying said moving image represented by said output signal, wherein undesirable effects of said emphasis processing operation as viewed on said display means are reduced.

29. A television receiver for decoding an encoded compressed signal representing a moving image and for displaying said moving image, said television receiver comprising:

means for receiving and decoding said encoded compressed signal to obtain a decoded uncompressed signal having at least a luminance signal component;

means for detecting a flatness value of said decoded uncompressed signal representing how smoothly said luminance signal component changes;

means for generating a random number;

means for generating a noise signal as a function of said flatness value and said random number;

means for adaptively combining said noise signal and said decoded uncompressed signal;

means for detecting a level of the combined decoded uncompressed signal and noise signal;

means for adjusting said level in accordance with a predetermined signal level;

means for emphasis processing said combined decoded uncompressed signal and noise signal to obtain an output signal, said emphasis processing means causing improvement of some aspects of said moving image and also causing deterioration of other aspects of said moving image by unintentionally emphasizing signal encoding and compressing operations; and means for displaying said moving image represented by said output signal, wherein undesirable effects of said emphasis processing operation as viewed on said display means are reduced.

30. The television receiver according to claim 19, wherein said means for generating is operative to generate said noise signal as a function of said flatness value and luminance signal component.

31. A television receiver for decoding an encoded compressed signal representing a moving image and for displaying said moving image, said television receiver comprising:

means for receiving and decoding said encoded compressed signal to obtain a decoded uncompressed signal having at least a luminance signal component;

means for receiving a quantization scale used during an encoding operation of said moving image;

means for generating a random number;

means for generating a noise signal as a function of said quantization scale and random number;

means for adaptively combining said noise signal and said decoded uncompressed signal;

means for detecting a level of the combined decoded uncompressed signal and noise signal;

means for adjusting said level in accordance with a predetermined signal level;

means for emphasis processing said combined decoded uncompressed signal and noise signal to obtain an output signal, said emphasis processing means causing improvement of some aspects of said moving image and also causing deterioration of other aspects of said moving image by unintentionally emphasizing signal encoding and compressing operations; and means for displaying said moving image represented by said output signal, wherein undesirable effects of said emphasis processing operation as viewed on said display means are reduced.

32. The television receiver according to claim 31, wherein said means for generating is operative to generate said noise signal as a function of said quantization scale and luminance signal component.

* * * * *